United States Patent
Ben-Dor

(10) Patent No.: US 12,256,164 B2
(45) Date of Patent: Mar. 18, 2025

(54) PIXEL CIRCUIT AND SOLID-STATE IMAGING DEVICE

(71) Applicant: Sony Semiconductor Solutions Corporation, Atsugi (JP)

(72) Inventor: Eshar Ben-Dor, Stuttgart (DE)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 18/282,221

(22) PCT Filed: Feb. 24, 2022

(86) PCT No.: PCT/EP2022/054653
§ 371 (c)(1),
(2) Date: Sep. 15, 2023

(87) PCT Pub. No.: WO2022/199972
PCT Pub. Date: Sep. 29, 2022

(65) Prior Publication Data
US 2024/0163583 A1  May 16, 2024

(30) Foreign Application Priority Data
Mar. 26, 2021 (EP) .................. 21165249

(51) Int. Cl.
*H04N 25/77* (2023.01)
(52) U.S. Cl.
CPC .................. *H04N 25/77* (2023.01)

(58) Field of Classification Search
CPC .................. H04N 25/77
See application file for complete search history.

(56) References Cited

U.S. PATENT DOCUMENTS

| | | |
|---|---|---|
| 4,147,943 A | 4/1979 | Peterson |
| 4,506,171 A | 3/1985 | Evans et al. |
| 4,649,293 A | 3/1987 | Ducourant |
| 5,245,223 A | 9/1993 | Lim et al. |

(Continued)

FOREIGN PATENT DOCUMENTS

| | | |
|---|---|---|
| EP | 0370814 A2 | 5/1990 |
| EP | 2124336 A1 | 11/2009 |

(Continued)

OTHER PUBLICATIONS

International Search Report and Written Opinion mailed on May 31, 2022, received for PCT Application PCT/EP2022/054653, filed on Feb. 24, 2022, 11 pages.

(Continued)

*Primary Examiner* — Tony Ko
(74) *Attorney, Agent, or Firm* — XSENSUS LLP

(57) ABSTRACT

A pixel circuit includes a photoreceptor module. The photoreceptor module includes a photoelectric conversion element. The photoreceptor module outputs a photoreceptor signal with a voltage level depending on a detector current generated by the photoelectric conversion element. A voltage memory capacitor receives the detector signal at a first electrode. A latch comparator circuit receives a latch input signal based on a shifted voltage signal tapped from a second electrode of the voltage memory capacitor.

18 Claims, 16 Drawing Sheets

(56) References Cited

U.S. PATENT DOCUMENTS

| | | | |
|---|---|---|---|
| 5,272,395 | A | 12/1993 | Vincelette |
| 6,392,449 | B1 | 5/2002 | Taft |
| 2018/0191972 | A1* | 7/2018 | Berner .................. H04N 25/75 |
| 2019/0214977 | A1 | 7/2019 | Verdant |
| 2020/0182692 | A1 | 6/2020 | Lilic et al. |
| 2020/0212902 | A1 | 7/2020 | Zhang et al. |
| 2020/0288073 | A1 | 9/2020 | Berner et al. |

FOREIGN PATENT DOCUMENTS

| | | | |
|---|---|---|---|
| EP | 3139595 | A1 | 3/2017 |
| EP | 3595295 | A1 | 1/2020 |
| EP | 3731516 | A1 | 10/2020 |

OTHER PUBLICATIONS

Moni et al., "High-Speed and Low-Power Dynamic Latch Comparator", 2012 International Conference on Devices, Circuits and Systems (ICDCS) 2012, DOI: 10.1109/icdcsyst.2012.6188715, Mar. 2012, 5 pages.

Ahlberg et al., "Simultaneous Sensing, Read-Out, and Classification on an Intensity-Ranking Image Sensor", Special Issue Paper, Linkoping University, Int. J. Circ. Theor. Appl., 2018, Available Online at: https://doi.org/10.1002/cta.2549, pp. 1-21.

* cited by examiner

PIXEL CIRCUIT AND SOLID-STATE IMAGING DEVICE

CROSS-REFERENCE TO RELATED APPLICATIONS

The present application is based on PCT filing PCT/EP2022/054653, filed Feb. 24, 2022, and claims priority from European Patent Application No. 21165249.0, filed Mar. 26, 2021, the entire contents of each are incorporated herein by reference.

FIELD OF THE INVENTION

The present disclosure relates to a pixel circuit and to a solid-state imaging device. In particular, the present disclosure is related to the field of event detection sensors reacting to changes in light intensity, such as dynamic vision sensors (DVS) and event-based vision sensors (EVS).

BACKGROUND

Computer vision deals with how machines and computers can gain high-level understanding from digital images or videos. Typically, computer vision methods aim at excerpting, from raw image data obtained through an image sensor, that type of information the machine or computer uses for other tasks.

Many applications such as machine control, process monitoring or surveillance tasks are based on the evaluation of the movement of objects in the imaged scene. Conventional image sensors with a plurality of pixels arranged in an array of pixels deliver a sequence of still images (frames). Detecting moving objects in the sequence of frames typically involves elaborate and expensive image processing methods.

Event detection sensors like DVS and EVS tackle the problem of motion detection by delivering information about the position of changes in the imaged scene. Unlike image sensors that transfer large amounts of image information in frames, transfer of information about pixels that do not change can be omitted, resulting in a sort of in-pixel data compression. The in-pixel data compression removes data redundancy and facilitates high temporal resolution, low latency, low power consumption, high dynamic range and little motion blur. DVS and EVS are thus well suited especially for solar or battery powered compressive sensing or for mobile machine vision applications where the motion of the system including the image sensor has to be estimated and where processing power is limited due to limited battery capacity. In principle, the architecture of DVS and EVS allows for high dynamic range and good low-light performance, in particular in the field of computer vision.

It is desirable to further reduce power consumption, pixel-to-pixel variations and the footprint of a pixel circuit for event detection in dynamic or event-based vision sensors.

SUMMARY OF INVENTION

Typically, a pixel circuit of a solid-state imaging device implementing event detection includes a photoreceptor conversion block (photoreceptor module) and a pixel back-end. The photoreceptor conversion block includes at least one photoelectric conversion element per pixel. The photoelectric conversion elements are typically arranged in rows and columns and each photoelectric conversion element can be identified by hands of a pixel address that typically includes a row address and a column address. Each photoreceptor conversion block outputs a photoreceptor signal, wherein a voltage level of the photoreceptor signal depends on the intensity of electromagnetic radiation detected by the photoelectric conversion element. The pixel back-end processes the photoreceptor signal and generates an event each time a change in intensity of the electromagnetic radiation exceeds a preset threshold. A readout circuit detects the event and compiles event information that includes the pixel address and, if applicable, information about the point in time when the event was detected.

The pixel back-end typically includes a comparator circuit and a memory cell. The comparator circuit continuously compares the photoreceptor signal with a reference signal and the memory cell stores the event until the readout circuit reads out and/or acknowledges receipt of the event. A controller may control the readout of the events from the various pixel circuits, e.g., at regular intervals or on demand.

A typical comparator circuit for dynamic or event-based image sensors includes an input stage and two parallel output stages, a first one for ON events and a second one for OFF events. Each stage comprises a pFET and an nFET with the load paths electrically connected in series between a high potential and a low potential. The typical comparator circuit conducts a static current even once an event has been detected and the comparison has been completed.

In addition, in each comparator stage, the input signal is passed to the gate of a pFETs and the respective reference signal is passed to the gate of an nFET. Due to the connection to FETs of different channel types, in each comparator stage the behavior of the reference signal and the input signal to each other may change significantly under different operating conditions.

Further, the gain of each comparator stage depends on the size of the pFET and the nFET, and a difficult trade-off has to be found between pixel size and comparator gain.

The present disclosure mitigates shortcomings of conventional pixel circuits of solid-state imaging devices suitable for event detection.

To this purpose, a pixel circuit according to the present disclosure includes a photoreceptor module. The photoreceptor module includes a photoelectric conversion element. The photoreceptor module outputs a photoreceptor signal with a voltage level depending on a detector current generated by the photoelectric conversion element. A voltage memory capacitor receives the detector signal at a first electrode. A latch comparator circuit receives a latch input signal based on a shifted voltage signal tapped from a second electrode of the voltage memory capacitor.

A solid-state imaging device according to the present disclosure includes a pixel array unit. The pixel array unit includes a plurality of pixel circuits. Each pixel circuit includes a photoreceptor module including a photoelectric conversion element. The photoreceptor module outputs a photoreceptor signal with a voltage level depending on a detector current generated by the photoelectric conversion element. A voltage memory capacitor receives the detector signal at a first electrode. The solid-state imaging device further includes a latch comparator circuit that receives a latch input signal based on a shifted voltage signal tapped from a second electrode of the voltage memory capacitor.

Since the latch comparator circuit can be implemented with smaller transistors and inherently stores the comparison result, the present embodiments may improve area efficiency for pixel circuits for event detection. Since the latch comparator circuit can be designed to consume electric power only in a comparatively short comparison period, the present embodiments may reduce overall current consumption.

The described embodiments, together with further advantages, will be best understood by reference to the following detailed description taken in conjunction with the accompanying drawings.

DETAILED DESCRIPTION

Embodiments for implementing techniques of the present disclosure (also referred to as "embodiments" in the following) will be described below in detail using the drawings. The techniques of the present disclosure are not limited to the embodiments, and various numerical values and the like in the embodiments are illustrative. In the following description, the same elements or elements with the same functions are denoted by the same reference signs, and duplicate descriptions are omitted.

Connected electronic elements may be electrically connected through a direct, permanent low-resistive connection, e.g., through a conductive line. The terms "electrically connected" and "signal-connected" may also include a connection through other electronic elements provided and suitable for permanent and/or temporary signal transmission and/or transmission of energy. For example, electronic elements may also be electrically connected or signal-connected through electronic switches such as transistors or transistor circuits, e.g. MOSFETs, transmission gates, and others.

The load path of a transistor is the controlled path of a transistor. For example, a voltage applied to a gate of a field effect transistor (FET) controls by field effect the current flow through the load path between source and drain.

Though in the following a technology for reducing size and power consumption of pixel circuits of solid-state imaging devices are described in the context of certain types of active image sensors for event detection, the technology may also be used for other types of active image sensors, e.g. such image sensors that combine event detection and intensity read-out.

Figure 1:
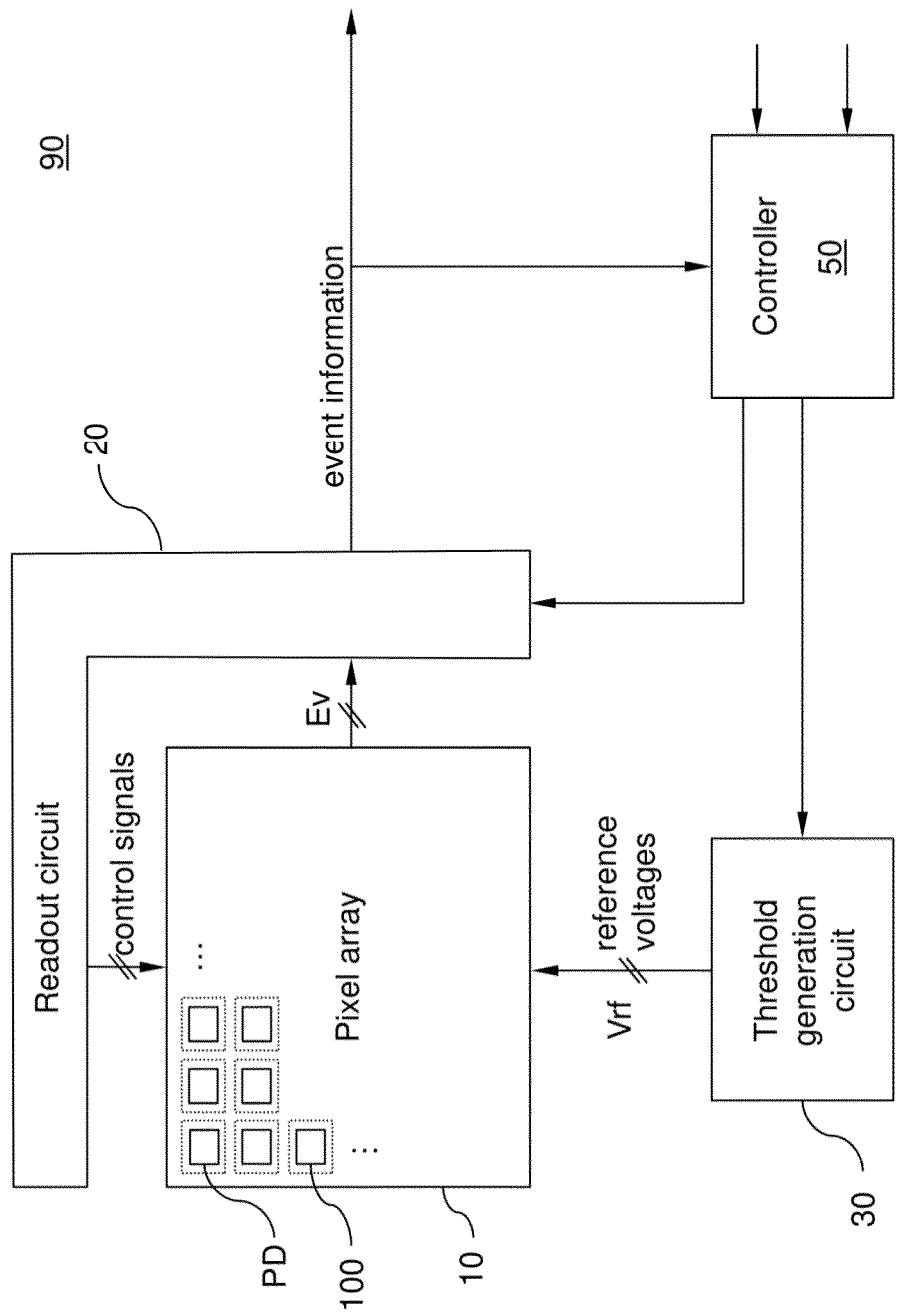
FIG. 1 is a simplified block diagram of a solid-state imaging device including a pixel array unit with pixel circuits for event detection and with a latch comparator circuit according to the present disclosure.

FIG. 1 is a block diagram of a solid-state imaging device 90 employing event-based image detection. The solid-state imaging device 90 includes a pixel array unit 10 with one or more pixel circuits 100, wherein each pixel circuit 100 includes at least one photoelectric conversion element PD. The pixel array unit 10 may include one single photoelectric conversion element PD or may be a one-dimensional pixel array with the photoelectric conversion elements PD of all pixel circuits 100 arranged along a straight or meandering line (line sensor). In particular, the pixel array unit 10 may be a two-dimensional array, wherein the photoelectric conversion elements PDs may be arranged along straight or meandering rows and along straight or meandering columns.

The illustrated embodiment shows a two dimensional array of photoelectric conversion elements PD, wherein the photoelectric conversion elements PD are arranged along straight rows and along straight columns running orthogonal to the rows.

A subset of pixel circuits 100 assigned to the photoelectric conversion elements PD of the same row form a pixel row, wherein the pixel circuits 100 of the same pixel row may share common control lines. A subset of pixel circuits 100 assigned to the photoelectric conversion elements PD of the same column form a pixel column. The pixel circuits 100 of the same pixel column may share common data signal lines. Each pixel circuit 100 of the pixel array unit 10 can be identified by a pixel address including a column address and a row address.

Each pixel circuit 100 converts electromagnetic radiation impinging onto a detection area of the photoelectric conversion element PD into digital, e.g. binary event data Ev, wherein the event data Ev indicates an event. Each event indicates a change of the radiation intensity, e.g. an increase by at least an upper threshold amount and/or a decrease by at least a lower threshold amount. Each pixel circuit 100 temporary stores the event data Ev.

A controller 50 performs a sequential control of the processes in the solid-state imaging device 90. For example, the controller 50 may control a threshold generation circuit 30 that determines and supplies reference voltages Vrf to individual pixel circuits 100 in the pixel array unit 10, wherein the pixel circuits 100 may use the reference voltages Vrf or voltage signals derived from the reference voltages Vrf as threshold voltages for comparison decisions. Alternatively or in addition, the controller 50 may control a readout circuit 20.

The readout circuit 20 passes control signals for reading out the event data Ev and/or for resetting the individual pixel circuits 100 to the pixel array unit 10. The readout circuit 20 outputs event information that includes at least information about the pixel addresses of those pixel circuits 100 in the pixel array 10, whose stored event data Ev indicate an event.

Figure 2:
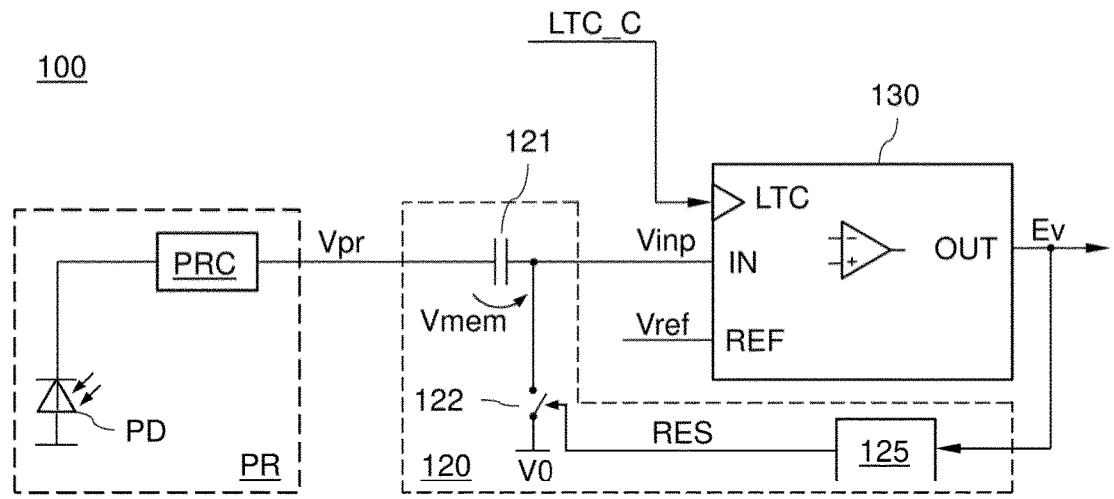
FIG. 2 is a simplified block diagram of a pixel circuit with a latch comparator circuit according to an embodiment.

FIG. 2 shows details of a pixel circuit 100 of the pixel array unit 10 in FIG. 1.

The pixel circuit 100 includes a photoreceptor module PR including a photoelectric conversion element PD. The photoreceptor module PR outputs a photoreceptor signal Vpr with a voltage level that depends on a detector current generated by the photoelectric conversion element PD. The pixel circuit 100 further includes a voltage memory capacitor 121 that receives the photoreceptor signal Vpr at a first electrode. The pixel circuit 100 further includes a latch comparator circuit 130 that receives a latch input signal Vinp, wherein the latch input signal Vinp is based on a shifted voltage signal Vshft tapped from a second electrode of the voltage memory capacitor 121.

The photoelectric conversion element PD may include or consist of a photodiode which converts electromagnetic radiation incident on a detection surface into the detector current by means of the photoelectric effect. The electromagnetic radiation may include visible light, infrared radiation and/or ultraviolet radiation. The amplitude of the detector current corresponds to the intensity of the incident electromagnetic radiation, wherein in the intensity range of interest the detector current increases approximately linearly with increasing intensity of the detected electromagnetic radiation.

The photoreceptor module PR may further include a photoreceptor circuit PRC that converts the detector current into a photoreceptor signal Vpr. The amplitude of the photoreceptor signal Vpr is a function of the detector current, wherein in the voltage range of interest the voltage amplitude of the photoreceptor signal Vpr increases with increasing detector current.

Across the voltage memory capacitor 121 a memory voltage Vmem drops. The amplitude of the memory voltage Vmem depends on a previously evaluated voltage of the photoreceptor signal Vpr. The voltage memory capacitor 121 is part of a voltage memory circuit 120 that updates the memory voltage Vmem each time the pixel circuit 100 detects an event. For example, the voltage memory circuit 120 may update the memory voltage Vmem with a voltage derived from or otherwise related to the amplitude of the photoreceptor signal Vpr for the detected event.

In particular, the pixel circuit 100 may include a voltage restore circuit 122 that connects the second electrode of the voltage memory capacitor 121 to a capacitor reference node V0 in a voltage restore period, e.g. for a complete voltage restore period.

The voltage restore circuit 122 disconnects the second electrode of the voltage memory capacitor 121 from the capacitor reference node V0 outside the voltage restore period, e.g. for a comparison period.

An event feedback circuit 125 may generate a restore signal RES in response to event data Ev indicating an event. The event feedback circuit 125 passes the restore signal RES to a control input of the voltage restore circuit 122. The restore signal RES controls the voltage restore circuit 122 to change between a restore state for the voltage restore period and a comparison state outside the restore period.

The capacitor reference node V0 may be a supply voltage rail, e.g. a supply voltage rail with the supply reference potential, or an output of a voltage reference circuit generating and supplying a constant voltage. Alternatively, the capacitor reference node V0 may be an internal node of an amplifier stage that amplifies and/or buffers the shifted voltage signal Vshft. For example, the capacitor reference node V0 is selected such that the voltage restore circuit 122 may be used to reduce the input offset of an amplifier stage that amplifies and/or buffers the shifted voltage signal Vshft.

The voltage memory circuit 120 may update the memory voltage Vmem by temporarily switching on the voltage restore circuit 122, wherein the memory voltage Vmem increases by that amount by which the voltage at the second electrode decreases, or wherein the memory voltage Vmem decreases by that amount by which the voltage at the second electrode increases. The amount by which the voltage at the second electrode changes is equal to the voltage difference between the currently detected event and the previously detected event. In this way, the voltage memory circuit 120 "shifts" the photoreceptor signal Vpr to a shifted voltage signal Vshft that fluctuates between a negative threshold value and a positive threshold value.

In other words, the restore period sets the latch input signal Vinp to a known voltage value, e.g. a voltage value that sets up the comparator for the most accurate comparison. After the restore period, the latch input signal Vinp is free to change based only on the nodes that are capacitively coupled to the second electrode of the voltage memory capacitor 121. In principle, the only node that is capacitively coupled to the second electrode of the voltage memory capacitor 121 is the first electrode of the voltage memory capacitor 121. When the photoreceptor signal Vpr at the first electrode of the voltage memory capacitor 121 changes by $\pm\Delta V$ due to a change in photodetector current, the latch input signal Vinp will also change by $\pm\Delta V$. Thus, during the comparison period, the latch input signal Vinp, i.e. the voltage that is used for the comparison with a latch reference signal Vref, is equal to Vref$\pm\Delta V$ no matter the absolute value of the voltage of the photoreceptor signal Vpr is.

Outside the voltage restore period, the voltage memory capacitor 121 receives the photoreceptor signal Vpr and the first electrode of the memory capacitor 121 carries an amount of charge that depends on the photoreceptor signal Vpr and thus on the intensity of electromagnetic radiation received by the photoelectric conversion element PD. The second electrode of the voltage memory capacitor 121 is connected to an input of the latch comparator circuit 130. The shifted voltage signal Vshft at the second electrode of the voltage memory capacitor 121 is a function of the voltage difference between the photoreceptor signal Vpr and the memory voltage Vmem and deviates from the difference between the photoreceptor signal Vpr and the memory voltage Vmem by a value related to the reference voltage signal Vref and the voltage of the photoreceptor signal Vpr in the voltage restore period.

The latch comparator circuit 130 includes a latch structure that makes a comparison decision between a latch input signal Vinp and a reference and that directly latches the result of the comparison decision.

The latch comparator circuit 130 may be signal-connected to one single voltage memory circuit 120 and may be part of one single pixel circuit 100. Alternatively, the latch comparator circuit 130 may be signal-connected to a plurality of voltage memory circuits 120 and may be shared among a plurality of pixel circuits 100 by means of a readout process using time multiplexing.

The latch comparator circuit 130 may have a signal input INP, a reference input REF and a control input LTC. The shifted voltage signal Vshft or a signal derived from the shifted voltage signal Vshft is passed to the signal input INP and provides the latch input signal Vinp of the latch comparator circuit 130. A latch reference signal Vref is passed to the reference input REF.

A latch control signal LTC_C applied to the control input LTC triggers a comparison between the latch input signal Vinp and the latch reference signal Vref. The latch comparator circuit 130 reaches a first stable output state when the voltage level of the latch input signal Vinp is higher than the voltage level of the latch reference signal Vref and reaches a second stable output state when the voltage level of the latch reference signal Vref is higher than the voltage level of the latch input signal Vinp. In other words, the latch comparator circuit 130 latches the result of the comparison and outputs the latched result as digital output signal (event) Ev at an output OUT. The latch control signal LTC_C applied to the control input LTC or another control signal applied to a supplemental control input may reset the latch structure.

For example, a rising edge or a trailing edge of the latch control signal LTC_C may trigger the latch comparator circuit 130 to start comparing the latch input signal Vinp with the latch reference signal Vref and the latch comparator circuit sets a digital, latched output signal to an output level that indicates the result of the comparison. The latched output signal is stable until the latch comparator circuit 130 is reset.

The latch comparator circuit 130 is active and consumes electric power only or predominantly during a comparison period between the starting edge of the latch control signal and the point in time when the latched output signal has reached the stable output level. Instead, conventional pixel circuits for DVS and EVS typically include analogue comparator stages that permanently amplify and compare an input signal with a reference signal and therefore continuously consume electric power.

The latch comparator circuit 130 integrates both comparator functionality and latch functionality and intrinsically latches the result of the comparison. Therefore the pixel circuit 100 does not necessarily require any additional memory cell, e.g. a register or a further latch, such that the pixel circuit 100 saves electric components required for a memory cell.

The latch structure may interface to the latch input signal and a latch reference signal with the same transistor type (n-channel or p-channel) such that the latch structure is less sensitive for manufacturing imperfections and changing operation conditions. For example, when manufacturing two nFETs on the same semiconductor die, any perturbation in the manufacturing process mostly impacts both nFETs in the same way, but often has opposing effects on nFETs on the one hand and pFETs on the other hand. In addition, changing operation conditions like temperature and supply voltage drifts typically affect two nFETs similarly, but nFET and pFETs differently. In this way, interface to the latch input signal and a latch reference signal with the same transistor type may contribute in reducing pixel-to-pixel variations Since the latch comparator circuit 130 uses rather positive feedback than high-gain amplification to achieve a fully digital output signal, the latch comparator circuit 130 may use comparatively small FETs. By contrast, a "linear" comparator stage that uses a high gain amplifier to reach digital level output typically requires an amplifier with high enough transconductance and output resistance, both of which require large FETs.

In particular, the latch comparator circuit 130 may use sufficiently small FETs such that the FETs of the latch comparator circuit 130 can be formed as thin gate FETs without adverse impact on the latching operation. The use of thin gate technology improves scalability and can contribute in reducing further the semiconductor area for the latch comparator circuit 130 in comparison to "linear" comparator stages. Therefore area efficiency of the latch comparator circuit 130 can be higher even if the latch comparator circuit 130 includes a higher number of FETs than the analogue comparator stages used in conventional pixel circuits for event detection.

The latch comparator circuit 130 therefore improves both accuracy and efficiency of the comparison process in a pixel circuit for event detection. In particular, the latch comparator circuit 130 may also reduce power consumption and die-area related costs.

The latch comparator circuit 130 may generate a latched output signal Ev indicating an increase and/or decrease of the latch input signal by a threshold voltage.

For example, the latched output signal Ev may be active and may have a "high" level in case the latch input signal exceeds the threshold voltage and may be inactive and may have a "low" level otherwise. In addition or alternatively, the latch comparator circuit 130 may generate an inverted latched output signal Ev that may be active and may have a "high" level in case the latch input signal does not exceed the threshold voltage and may be inactive and may have a "low" level otherwise.

The threshold voltage may be the amplitude of a latch reference signal. The latch reference signal may be a fixed voltage with a constant voltage level at least during a complete comparison period of the pixel circuit 100. For example, a voltage reference circuit may generate a constant voltage signal and may pass the constant voltage signal to the reference input of the latch comparator circuit 130. The voltage reference circuit may be programmable such that the voltage level of the constant voltage signal may be adjusted to different operational modes of the pixel circuit 100. According to another example, the latch reference signal may be a time-variant signal that changes at a rate comparable to the latch input signal. For example, the latch input signal and the latch reference signal may be complementary signals of a differential pair of voltage signals.

The latch reference signal for the latch comparator circuit 130 and the capacitor reference voltage V0 for the voltage memory circuit 120 may be derived from a common constant voltage generated and directly supplied from a single reference voltage source.

Figure 3:
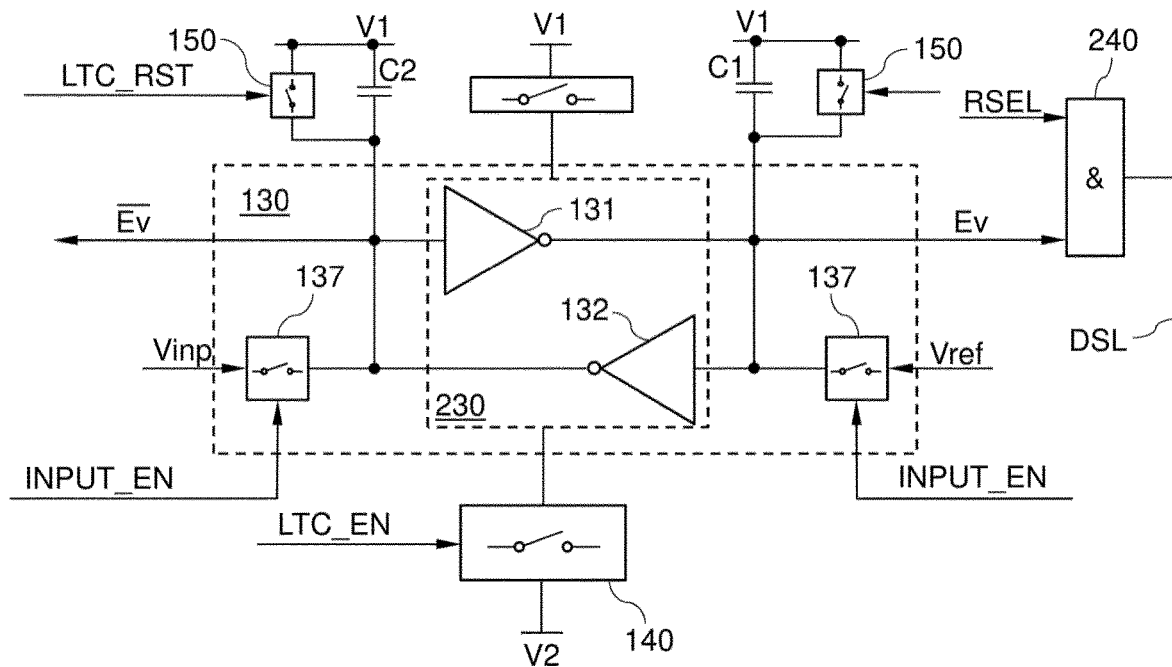
FIG. 3 is a simplified circuit diagram of a pixel circuit according to an embodiment with a latch comparator circuit including two inverter circuits in positive feedback.

FIG. 3 shows a latch comparator circuit 130 that includes a first inverter circuit 131 and a second inverter circuit 132, wherein the first inverter circuit 131 and the second inverter circuit 132 are in positive feedback, and wherein an input of the first inverter circuit 131 is signal-connected to a signal input of the latch comparator circuit 130.

In other words, the latch input signal Vinp, a voltage signal derived from the latch input signal Vinp by amplifying and/or buffering, or a current signal derived from the latch input signal Vinp is passed to the input of the first inverter circuit 131.

An input of the second inverter circuit 132 may be signal-connected to a reference input of the latch comparator circuit 130, wherein the latch reference signal Vref, a voltage signal derived from the latch reference signal Vref by amplifying and/or buffering, or a current signal derived from the latch reference signal Vref is passed to the input of the second inverter circuit 132.

An output of the first inverter circuit 131 is connected to the input of the second inverter circuit 132 and the output signal of the first inverter circuit 131 is passed to the input of the second inverter circuit 132. An output of the second inverter circuit 132 is connected to the input of the second inverter circuit 132 and an output signal of the second inverter circuit 132 is passed to the input of the first inverter circuit 131.

The two inverter circuits 131, 132 in positive feedback form a simple latch structure 230 that may include mainly or exclusively digital thin gate transistors. Each inverter circuit 131, 132 outputs a voltage representing the opposite logic-level to its input and inverts the input signal applied. Each inverter circuit 131, 132 may include a single nFET and a resistive load, a single pFET and a resistive load or two complementary FETs in a CMOS configuration, by way of example.

The latch comparator circuit 100 may include a latch input circuit 137. The latch input circuit 137 decouples the latch input signal Vinp of the latch comparator circuit 130 from signals generated by the latch comparator circuit 130.

Accordingly, the latch input circuit 137 may decouple the latch reference signal Vref from signals generated by the latch comparator circuit 130. In particular, the latch input circuit 137 may decouple the latch input signal Vinp and the latch reference signal Vref from the latch structure 230 permanently or for at least a portion of the comparison period.

The latch input circuit 137 may include a first part that decouples the latch input signal Vinp from internal signals of the latch structure 230 and may include a second part that decouples the latch reference signal Vref from internal signals of the latch structure 230. The first part is signal-connected to an input of the first inverter circuit 131. The second part is signal-connected to an input of the second inverter circuit 132.

For example, the latch input circuit 137 may include a sample and hold circuit 160 with a first part sampling the latch input signal Vinp on the output capacitance C2 of the second inverter circuit 132 and with a second part sampling the latch reference signal Vref on the output capacitance C1 of the first inverter circuit 131.

According to another example, the latch input circuit 137 may include a first input current source circuit connected to an input of the first inverter circuit 131 and a second input current source circuit connected to an input of the second inverter circuit 132, wherein the latch input circuit 137 is configured to draw charge from an output capacitance C1 of the first inverter circuit 131 and from an output capacitance C2 of the second inverter circuit 132 at a rate proportional to the voltages of the latch input signal and the latch reference signal Vref.

The first part and the second part of the latch input circuit 137 may be matched. The first part and the second part may include matching components. For example, the first part and the second part may include transistors of the same channel type, e.g., nFETs with the same channel length and the same channel width, or pFETs with the same channel length and channel width. In particular, the first part and the second part may form a differential pair or may include a differential pair.

The latch input circuit 137 may include a transistor stage with at least one transistor circuit for each input of the latch structure 230. Each transistor circuit may include one or more transistors. The latch input signal Vinp controls an input transistor circuit and an output of the input transistor circuit is signal-connected with the input of the first inverter circuit 131. The latch reference signal Vref controls a reference transistor circuit and an output of the reference transistor circuit is signal-connected with the input of the second inverter circuit 132. The input transistor circuit and the reference transistor circuit may include a matched transistor pair, e.g. a differential pair.

The pixel circuit 100 may further include a latch enable circuit 140 configured to enable the latch comparator circuit 130 at least for a comparison period.

The latch enable circuit 140 may disable the latch comparator circuit 130 at least for a latch reset period.

The latch enable circuit 140 may enable the latch comparator circuit 130 by passing a high potential V1 and/or a low potential V2 to appropriate sides of the load paths of the inverter circuits 131, 132. The latch enable circuit 140 may disable the latch comparator circuit 130 by separating at least one side of the load paths of the inverter circuits 131, 132 from a low potential V2 and/or from a high potential V1.

The latch enable circuit 140 may include one or more electronic switches. For example, the latch enable circuit 140 may include one or more pFETs (p channel field effect transistor) between the high potential V1 and high potential nodes of the load paths of the inverter circuits 131, 132 and/or may include one or more nFETs (n channel field effect transistor) between low potential nodes of the load paths of the inverter circuits 131, 132 and the low potential V2.

In case the latch input circuit 137 includes input current source circuits, the latch enable circuit 140 may include one single electronic switch connected between a common node of the latch input circuit 137 and the low potential V1. Alternatively, the latch enable circuit 140 may include a first electronic switch connected between the load path of the first inverter circuit 131 and the latch input circuit 137 and a second electronic switch connected between the load path of the second inverter circuit 132 and the latch input circuit 137.

A comparator reset circuit 150 may pre-charge output capacitances of the latch comparator circuit 130 in a latch reset period.

The comparator reset circuit 150 may preset the voltages across the output capacitances C1, C2 of the inverter circuits 131, 132 to predefined voltages. For example, the comparator reset circuit 150 may include two electronic switches that may connect outputs of the first and second inverter circuits 131, 132 with a predefined potential, e.g. the high potential V1, in the latch reset period in order to set the voltages across the output capacitances C1, C2 of the inverter circuits 131, 132 to the same predefined voltage. The predefined voltage may be high potential, e.g. the positive supply voltage VDD, when the latch input circuit 137 sinks current to ground, e.g. through nFETs. The predefined voltage may be a low potential, e.g. the supply reference potential VSS, when the latch input circuit 137 sources current from a supply line, e.g. through pFETs.

The comparator reset circuit 150 may disconnect the outputs of the inverter circuits 131, 132 from the high potential V1 outside the latch reset period, in particular for the comparison period and, if applicable, for a latch period following the comparison period. The comparator reset circuit 150 may be active for the same time for which the latch comparator circuit 130 is disabled.

A latch reset signal LTC_RST is passed to the comparator reset circuit 150. The latch reset signal LTC_RST controls the comparator reset circuit 150 to change between a reset state for the latch reset period and a comparison state for the comparison period and, if applicable, for the latch period.

The latch comparator circuit 130 inherently stores the comparison result and may be interfaced to a data signal line DSL without any intermediate latch or memory cell. For example, the latched output signal Ev may be passed to a select circuit 240 and a row select signal RSEL may control the select circuit 240 to pass the latched output signal Ev or a signal derived from the latched output signal Ev to the data signal line DSL for a row select period. According to other examples, the latched output signal Ev may be passed to one or more memory cells or latches before being passed to the data signal line in order to decouple the event capture rate from the read out rate.

Figure 4:
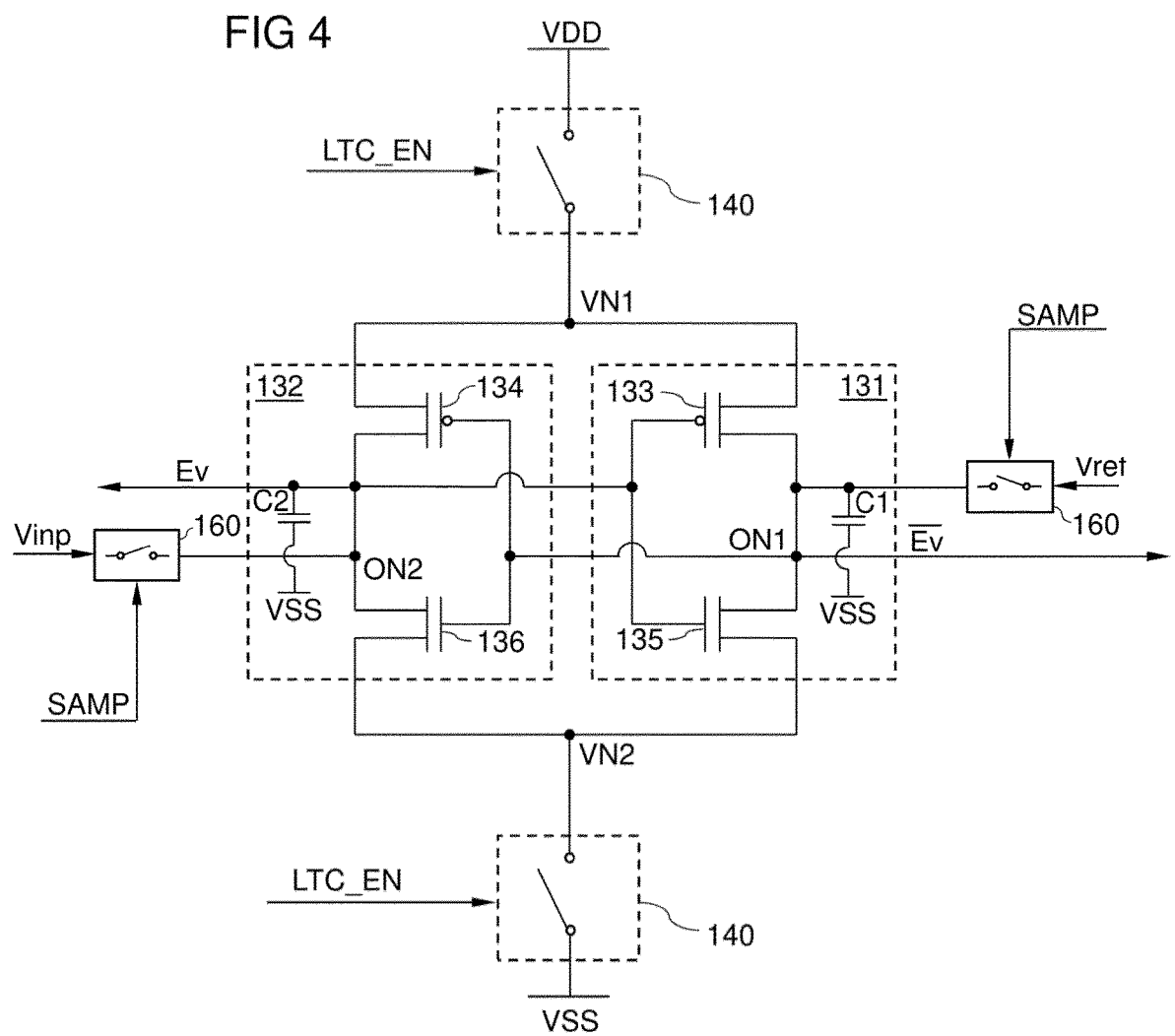
FIG. 4 is a simplified block diagram of a pixel circuit with a latch comparator circuit according to an embodiment concerning sampled input and reference signals.

FIG. 4 shows another embodiment with the latch comparator circuit 130 including a first inverter circuit 131 and a second inverter circuit 132, wherein the first and second inverter circuits 131, 132 are in positive feedback, and wherein an input of the first inverter circuit 131 receives the latch input signal Vinp. Each of the inverter circuits 131, 132 includes a CMOS (complementary metal oxide semiconductor) inverter.

Each CMOS converter includes a p channel transistor 133, 134 and an n channel transistor 135, 136 with the load paths electrically connected in this order in series between a high potential node VN1 and a low potential node VN2. The high potential node VN1 may be connected to the positive supply voltage VDD or may be connectable to the positive supply voltage VDD for the comparison period. The low potential node VN2 may be connected to the supply reference potential VSS or may be connectable to the supply reference potential VSS for the comparison period.

In particular, the first inverter circuit 131 includes a first CMOS inverter with a first p channel transistor 133 and a first n channel transistor 135, wherein a load path of the first p channel transistor 133 and a load path of the first n channel transistor 135 are connected in series between the high potential node VN1 and the low potential node VN2 in this order. The first CMOS inverter has a first output capacitance C1 at a first output node ON1 between the first p channel transistor 133 and the first n channel transistor 135.

The second inverter circuit 132 includes a second CMOS inverter with a second p channel transistor 134 and a second n channel transistor 136, wherein a load path of the second p channel transistor 134 and a load path of the second n channel transistor 136 are connected in series between the high potential node VN1 and the low potential node VN2 in this order. The second CMOS inverter has a second output capacitance C2 at a second output node ON1 between the second p channel transistor 134 and the second n channel transistor 136.

A sample/reset circuit 160 and a latch enable circuit 140 combine the functionality of a comparator reset circuit and a latch input circuit. In particular, a latch reset period includes a sample period and a hold period directly following the sample period. For the sample and hold periods, the latch enable circuit 140 may disable the latch comparator circuit 130 by separating the inverter circuits 131, 132 from the supply reference potential VSS and from the positive supply voltage VDD.

Further for the sample period, the sample/reset circuit 160 passes the latch reference signal Vref to the first output node ON1 and pre-charges the first output capacitance C1 by the voltage of the latch reference signal Vref. In addition, the sample/reset circuit 160 passes the latch input signal to the second output node ON2 and pre-charges the second output capacitance C2 by the voltage of the latch input signal Vinp, thereby presetting the voltages at the first and second output nodes ON1, ON2. A hold period may start with disconnecting the latch input signal and the latch reference signal from the first and second output nodes ON1, ON2. This leaves the first and second output nodes ON1, ON2 floating and holding charges corresponding to the voltages of the latch reference signal Vref and the latch input signal Vinp, respectively.

For a comparison period following the hold period or following directly the sample period, the latch enable circuit 140 enables the latch comparator circuit 130 by supplying a positive supply voltage VDD to the drains of the first and second p channel transistors 133, 134 and by suppling a supply reference potential VSS to sources of the first and second n channel transistors 135, 136.

At the end of the comparison period, the voltages on the output nodes ON1, ON2 have reached stable states according to the voltages previously sampled at the output nodes ON1, ON2, wherein the output node with the initially higher voltage reaches a stable high state close to the positive supply voltage VDD and the output node with the initially lower voltage reaches a stable low state close to the supply reference potential VSS.

A sample signal SAMP is passed to a control input of the sample/reset circuit 160 and controls the sample/reset circuit 160 to change from a comparison state into the sample state and from the sample state into the hold state or into the comparison state. A latch enable signal LTC_EN is passed to a control input of the latch enable circuit 140 and controls the latch enable circuit 140 to change from the comparison state into the sample state and from the sample state or from the hold state into the comparison state.

A latched output signal Ev of the second inverter circuit 132 is available at and can be tapped from the second output node ON2 An inverted latched output signal Ev of the first inverter circuit 131 may be available at and can be tapped from the second output node ON2.

Figure 5:
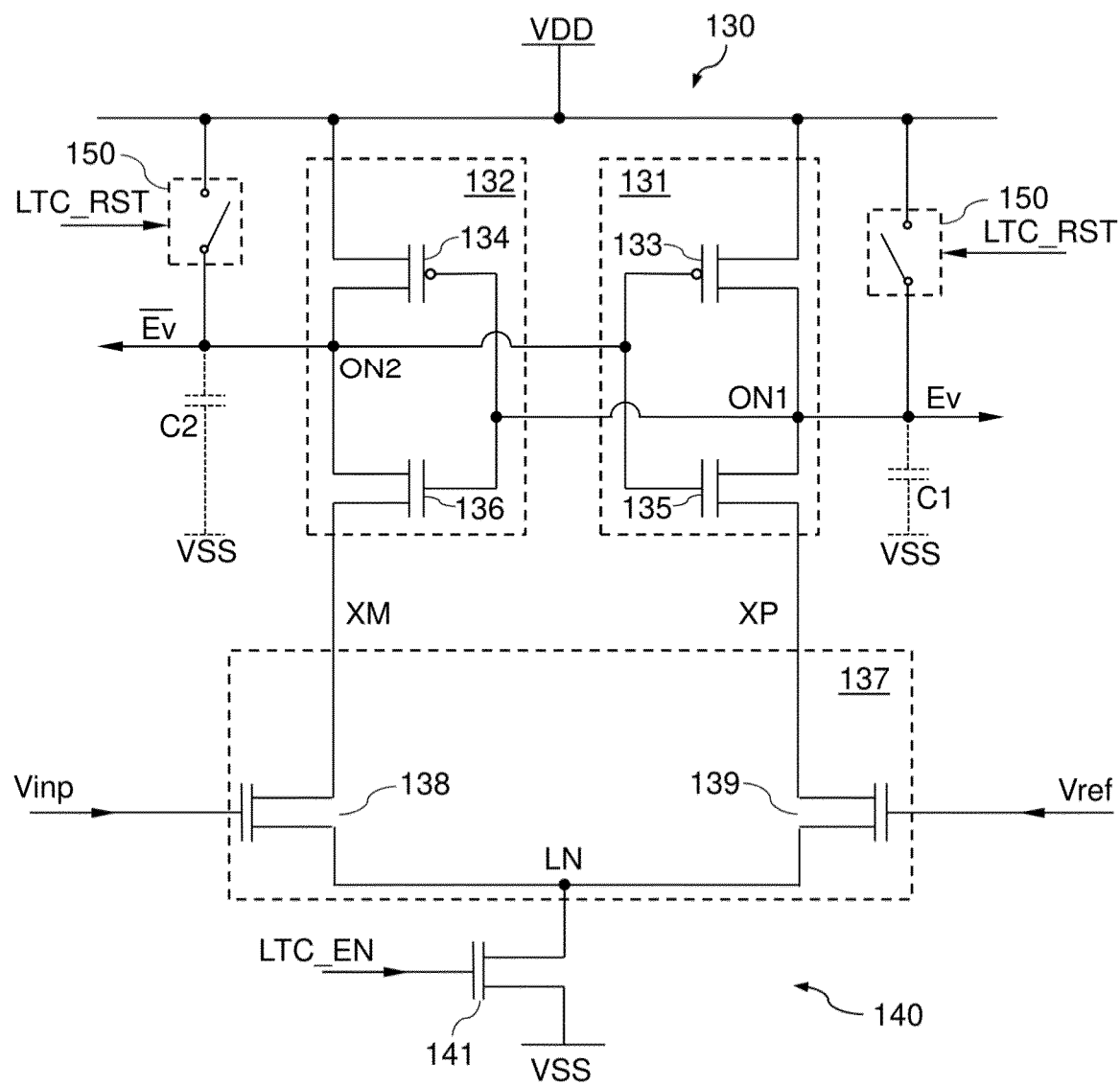
FIG. 5 is a simplified block diagram of a pixel circuit with a latch comparator circuit according to an embodiment concerning input and reference signals applied through current sources.

FIG. 5 shows a latch comparator circuit 130 that includes two CMOS inverters and a latch input circuit 137 with a transistor stage that facilitates the input signals to be applied as current signals.

In particular, the latch comparator circuit 130 includes an n channel first input transistor 138 and an n channel second input transistor 139. A load path of the first input transistor 138 is connected in series between the CMOS inverter of the second inverter circuit 132 and a low potential node LN. A load path of the second input transistor 139 is connected in series between the CMOS inverter of the first inverter circuit 131 and the low potential node LN.

The first input transistor 138 and the second n channel transistor 136 of the second inverter circuit 132 are signal-connected through the gate-to-source voltage of the second n channel transistor 136. The second input transistor 139 and the first n channel transistor 135 of the first inverter circuit 131 are signal-connected through the gate-to-source voltage of the first n channel transistor 135.

The first input transistor 138 and the second input transistor 139 have the same channel type (n channel) and may have the same channel length and channel width. The first and second input transistors 138, 139 may be a differential pair.

The latch input signal Vinp is passed to the gate of the first input transistor 138 and affects the current in the load path of the second inverter circuit 132, the potential at node XM at the source of the second n channel transistor 136 of the second inverter circuit 132, the potential at a second output node ON2 and the potential at the input of the first inverter circuit 131. The latch reference signal Vref is passed to the gate of the second input transistor 139 and affects the current in the load path of the first inverter circuit 131, the potential at node XP at the source of the first n channel transistor 135 of the first inverter circuit 131, the potential at a first output node ON1 and the potential at the input of the second inverter circuit 132.

The first output node ON1 of the first inverter circuit 131 has a first capacitance C1. The second output node ON2 of the second inverter circuit 132 has a second capacitance C2. Since the first and the second inverter circuits 131, 132 are almost identical the first and second capacitances C1, C2 are equal or deviate from each other only to a negligible degree.

A first part of a comparator reset circuit 150 includes a first electronic switch 151, e.g. a first reset pFET, between a positive supply voltage VDD and the first output node ON1. A second part of the comparator reset circuit 150 includes a second electronic switch 152, e.g. a second reset pFET, between the positive supply voltage VDD and the second output node ON2. A latch reset signal LTC_RST is passed to the first and second electronic switches 151, 152. The latch reset signal LTC_RST turns on the first and second electronic switches 151, 152 for a latch reset period and turns off the first and second electronic switches 151, 152 for a comparison period following the latch reset period and, if applicable, for a latch period following the comparison period.

A latch enable circuit 140 includes an enable nFET 141 with a load path between the sources of the first and second input transistors 138, 139 and the supply reference potential VSS. A latch enable signal LTC_EN is passed to the gate of the enable nFET 141. The latch enable signal LTC_EN turns on the enable nFET 141 for the comparison period and, if applicable, for the latch period and turns off the enable nFET 141 for the latch reset period.

A comparison cycle may start with an inactive latch enable signal LTC_EN. The enable nFET 141 is off and the first and second inverter circuits 131, 132 are disabled. Alternatively, the comparison cycle may start with an active latch enable signal LTC_EN such that the comparison period can directly follow the latch reset period.

The latch reset period may start with the latch reset signal LTC_RST becoming active and closing the electronic switches 151, 152, wherein the voltages across the first and second capacitances C1, C2 are set to approximately the positive supply voltage VDD. With the latch reset signal LTC_RST changing to inactive, the electronic switches 151, 152 open and the latch reset period ends.

The comparison period may start with the latch enable signal LTC_EN becoming active and turning on the enable nFET 141. The latch enable signal LTC_EN may become active synchronously with the latch reset signal LTC_RST becoming inactive, or later. Alternatively, the latch enable signal LTC_EN is yet active and the comparison period starts with the latch reset signal LTC_RST changing to inactive. The latch input signal Vinp controls the current through the first input transistor 138 and affects the voltage at node XM at the source of the second n channel transistor 136. The latch reference signal Vref controls the current through the second input transistor 139 and affects the voltage at node XP at the source of the first n channel transistor 135.

If the latch input signal Vinp is higher than the latch reference signal Vref, the first input transistor 138 conducts more current. The potential at the source of the second n channel transistor 136 drops faster than the potential at the source of the first n channel transistor 135. The second n channel transistor 136 turns on faster than the first n channel transistor 135 and pulls the second output node ON2 faster to low potential than the first n channel transistor 135 pulls the first output node ON1 to low potential. In addition, the first p channel transistor 133 turns on faster than the second p channel transistor 134, wherein the first p channel transistor 133 pushes the first output node ON1 to high potential. The positive feedback between the first and second inverter circuits 131, 132 amplifies the initial tendency in the faster second inverter circuit 132 and further delays and finally reverses the tendency in the first inverter circuit 131 until the inverter circuits 131, 132 lock into a final state.

In the final state, the second n channel transistor 136 is "on" and the second p channel transistor 134 is "off" such that the second output node ON2 is at low potential. The first n channel transistor 135 is "off" and the first p channel transistor 133 is "on" such that the first output node ON1 is at high potential. The inverter circuits reach complementary states when the amplitude of the latch input signal Vinp is lower than the amplitude of the latch reference signal Vref.

Since in the final state the potential at a gate of the inverter circuits is either close to the supply reference potential VSS or close to the positive supply voltage VDD, the n channel transistors and p channel transistors of the inverter circuits are "strongly off" or "strongly on" such that the final state is stable.

The structure of the latch comparator circuit 130 may also be "flipped" with the first and second input transistors 138, 139 being p channel transistors arranged between the positive voltage supply VDD and the CMOS inverters.

Though described in detail for detecting an ON/rising event, the same latch circuit may also be used for detecting an OFF/falling event, wherein a different latch reference signal with another voltage level than the latch reference signal for the ON/rising event is passed to the reference input, and wherein the opposite output node as for the ON/rising event is used for tapping the OFF/falling event. Alternatively, a first latch comparator circuit is used for detecting the ON/rising event and a second latch comparator circuit is used for detecting the OFF/falling event, wherein the first and the second latch comparator circuit may share the same latch input signal Vinp.

In FIGS. 6 to 9 the photoreceptor circuit PRC may include a logarithmic amplifier stage 111 and a buffer stage 112. The photodetector current generated in the photoelectric conversion element PD is passed to an input of the logarithmic amplifier stage 111. The logarithmic amplifier stage 111 may include a common source amplifier circuit with a predetermined current-to-voltage transfer characteristic. In addition, the logarithmic amplifier stage 111 may ensure that the voltage across the photoelectric conversion element PD is almost constant and does not vary with the amplitude of the photodetector current. According to an example, the predetermined current-to-voltage transfer characteristic may be a logarithmic current-to-voltage transfer characteristic. The logarithmic amplifier stage outputs a photoreceptor signal Vpr, wherein a voltage of the photoreceptor signal Vpr may be linearly related to the logarithm of the photodetector current.

The photoreceptor signal Vpr is passed to the buffer stage 112 that may buffer the photoreceptor signal Vpr. In particular, the buffer stage 112 may have high input resistance and low output impedance. For example, the buffer stage 112 may include a source follower circuit.

The photoreceptor circuit PRC passes the photoreceptor signal Vpr to the voltage memory circuit 120, e.g. to a first electrode of the memory capacitor 121. The voltage memory circuit 120 passes a shifted voltage signal Vshft to the latch comparator circuit 130.

The latch comparator circuit 130 includes a latch structure 230 and an input stage 137 with a first input transistor 138 and a second input transistor 139 as described with reference to FIG. 5. The gate of the first input transistor 138 provides the signal input of the latch comparator circuit 130 and receives the shifted voltage signal as input signal Vinp. The gate of the second input transistor 139 provides the reference input and receives the latch reference signal Vref.

A first part of a comparator reset circuit 150 includes a first reset pFET 153 with a load path between the positive supply voltage VDD and the first output node ON1. A second part of the comparator reset circuit 150 includes a second reset pFET 154 between the positive supply voltage VDD and the second output node ON2. An inverted latch reset signal $\overline{RST\_CMP}$ is passed to the gates of the first and second reset pFETs 153, 154. The inverted latch reset signal $\overline{RST\_CMP}$ turns on the first and second reset pFETs 153, 154 for a latch reset period and turns off the first and second reset pFETs 153, 154 for a comparison period.

The latch enable circuit 140 includes an enable nFET 141 between the sources of the first and second input transistors 138, 139 and the supply reference potential VSS. The inverted latch reset signal $\overline{RST\_CMP}$ is passed to the gate of the enable nFET 141. The inverted latch reset signal $\overline{RST\_CMP}$ turns on the enable nFET 141 for a comparison period and turns off the enable nFET 141 for a latch reset period.

In particular, for the latch reset period, a low level of the inverted latch reset signal $\overline{RST\_CMP}$ turns on the first and second reset pFETs 153, 154 and turns off the enable nFET 141. The first and second reset pFETs 153, 154 connect the first and second output nodes ON1, ON2 to the positive supply voltage VDD and the enable nFET 141 disconnects the latch comparator circuit 130 from the supply reference potential VSS.

With a rising edge on the inverted latch reset signal $\overline{RST\_CMP}$ the first and second reset pFETs 153, 154 turn off and the enable nFET 141 turns on. With the enable nFET 141 connecting the latch comparator circuit 130 to the supply reference potential VSS, the latch comparator circuit 130 starts to compare the voltage on the gate of the first input transistor 138 with the voltage on the gate of the second input transistor 139 as described with reference to FIG. 5.

The latch comparator circuit 130 receives the latch input signal Vinp at a signal input and receives the latch reference signal Vref at a reference input. The pixel circuit 100 further includes a voltage restore circuit 122 configured to match voltages at the signal input and the reference input of the latch comparator circuit 130 in a voltage restore period.

The voltage restore circuit 122 is part of the voltage memory circuit 120 that updates the memory voltage Vmem across the voltage memory capacitor 121 each time the pixel circuit 100 detects an event. In particular, the first input transistor 138 and the second input transistor 139 may be well-matched transistors, e.g. a differential pair such that the comparator offset varies only little between the latch comparator circuits 130 assigned to the same pixel array.

Figure 6:
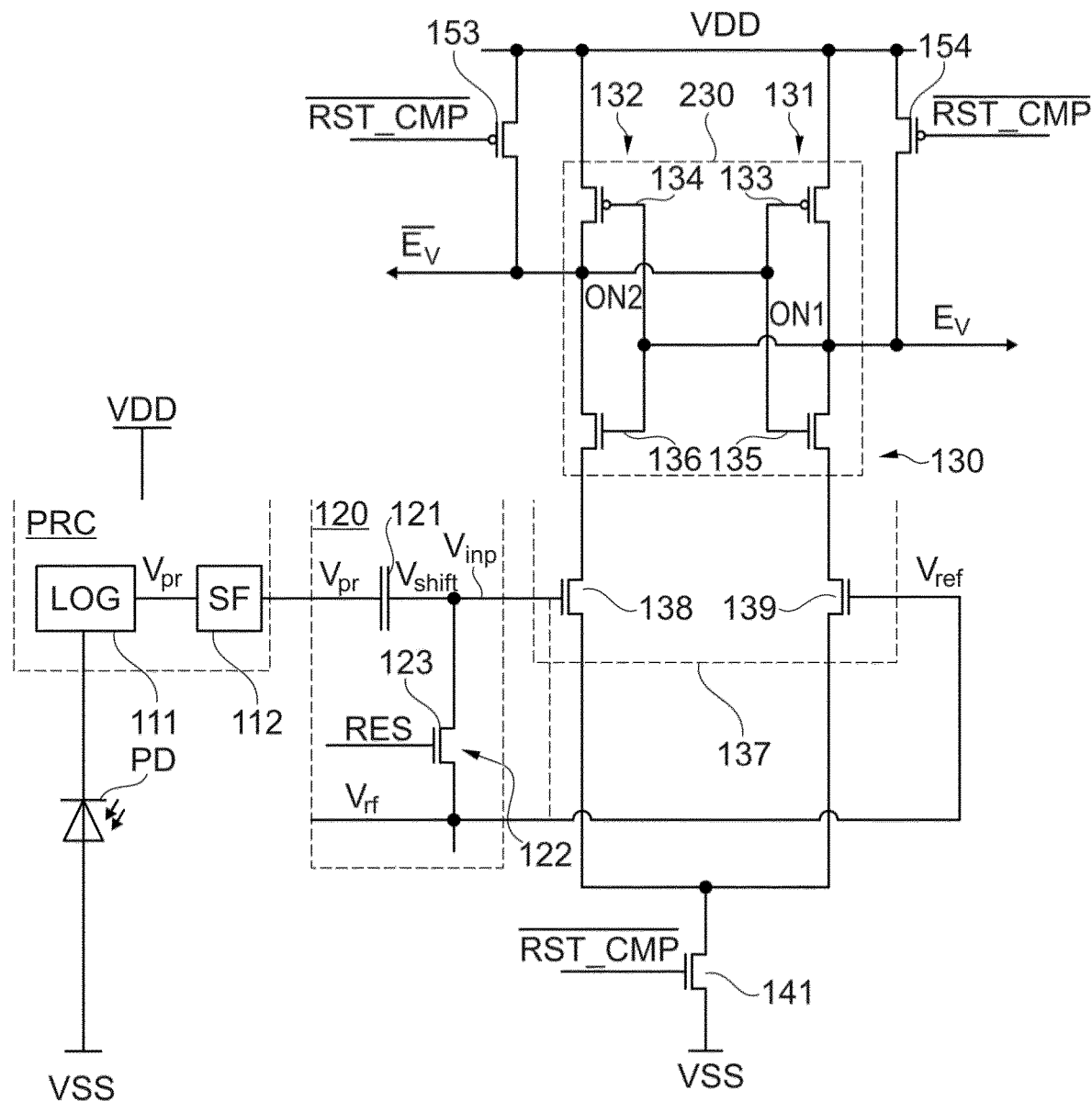
FIG. 6 is a simplified circuit diagram of a pixel circuit with a latch comparator circuit according to an embodiment with a voltage restore transistor used for memory voltage reset.

In the pixel circuit 100 of FIG. 6, the voltage restore circuit 122 connects the signal input and the reference input of the latch comparator circuit 130 in the voltage reset period.

In particular, the second electrode of the voltage memory circuit 120 may be directly connected to the signal input, wherein the shifted voltage signal Vshft is directly passed to the gate of the first input transistor 138 and effective as latch input voltage Vinp of the latch comparator circuit 130. A constant reference voltage Vrf is directly passed to the gate of the second input transistor 138 and provides the latch reference signal Vref.

The voltage restore circuit 122 may include one or more transistors, e.g. one or more pFETs, transmission gates or nFETs. In the illustrated example, the voltage restore circuit 122 includes a restore nFET 123 that directly connects the second electrode of the memory capacitor 121 with the latch reference signal Vref in the voltage restore period. A restore signal RES is passed to the gate of the restore nFET 123. The restore signal RES turns on the restore nFET 123 in a voltage restore period and may turn off the restore nFET otherwise. A voltage restore period may start when an event has been detected in the directly preceding comparison period. A voltage restore period may also be initiated by further control signal, e.g. in case of a global reset effective for a complete pixel array.

One single reference voltage supplying the constant reference voltage Vrf provides both the latch reference signal Vref for the latch comparator circuit 130 and the capacitor reference potential V0 of the voltage memory circuit 120.

The latch comparator circuit 130, the latch enable circuit with the enable nFET 141 and the comparator reset circuit with the first reset pFET 153 and the second reset pFET 154 consume electric power only for the switching processes. Once reset and comparison have settled, the latch comparator circuit 130 is quasi static and does not consume power. The positive feedback between the inverter circuits supports fast comparison times. The comparatively low total number of elements requires only a small area on a semiconductor die and the type of elements (thin gate FETs) is to a high degree scalable with modern CMOS process nodes.

Figure 7:
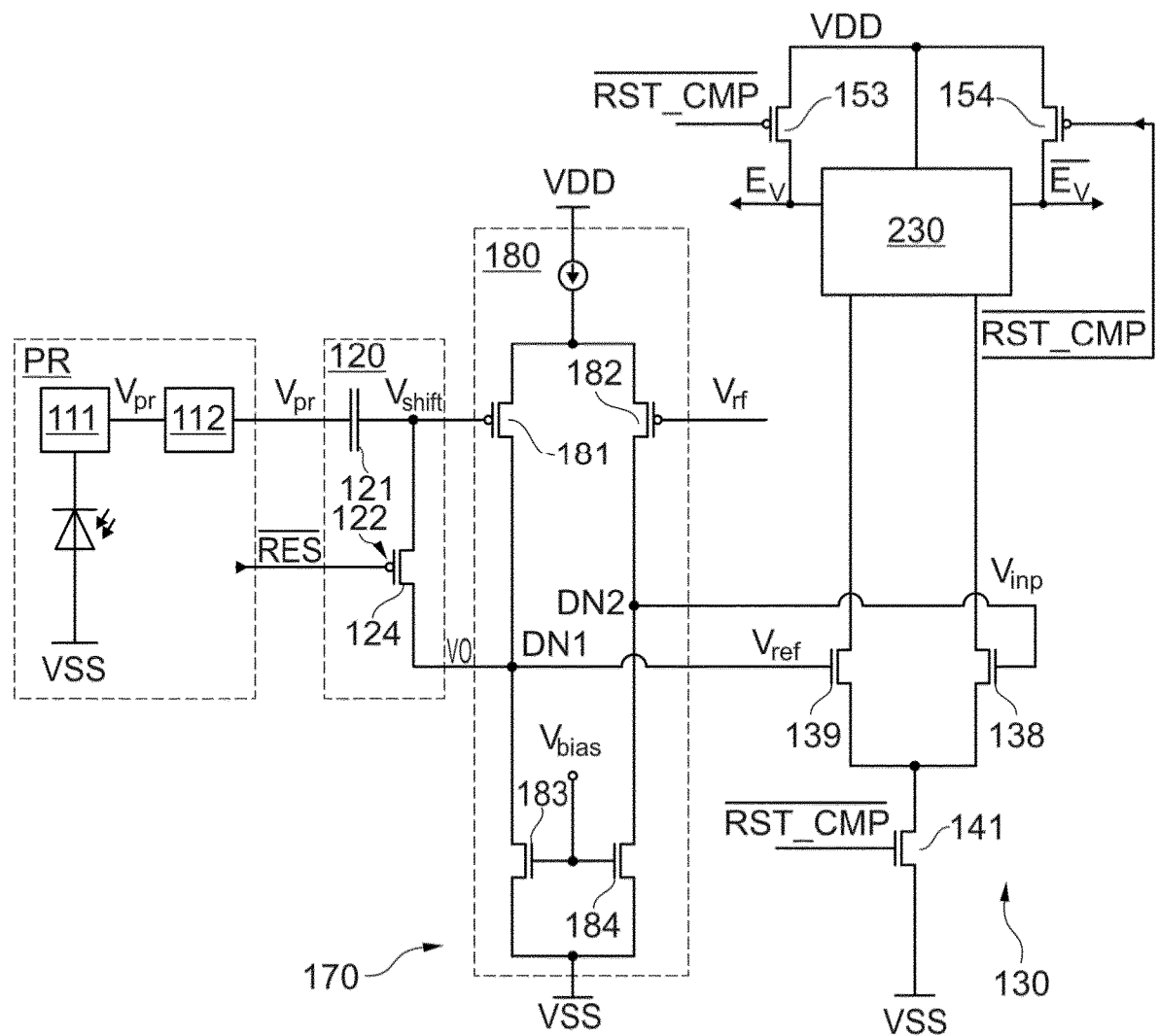
FIG. 7 is a simplified circuit diagram of a pixel circuit with a latch comparator circuit according to an embodiment with a differential amplifier circuit for the input signals of the latch comparator circuit.
Figure 8:
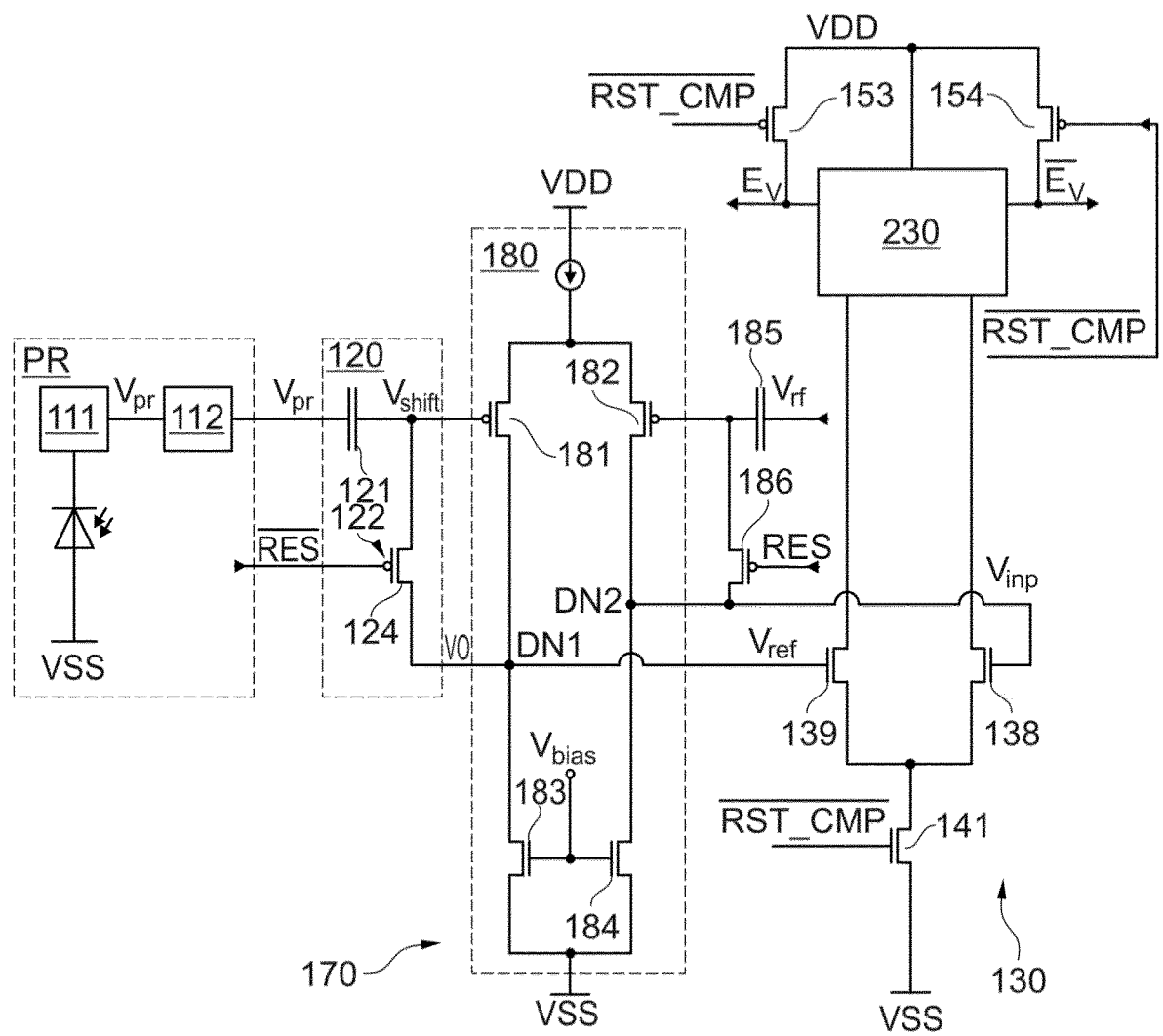
FIG. 8 is a simplified circuit diagram of a pixel circuit with a latch comparator circuit according to an embodiment with a differential amplifier circuit with balanced inputs.
Figure 9:
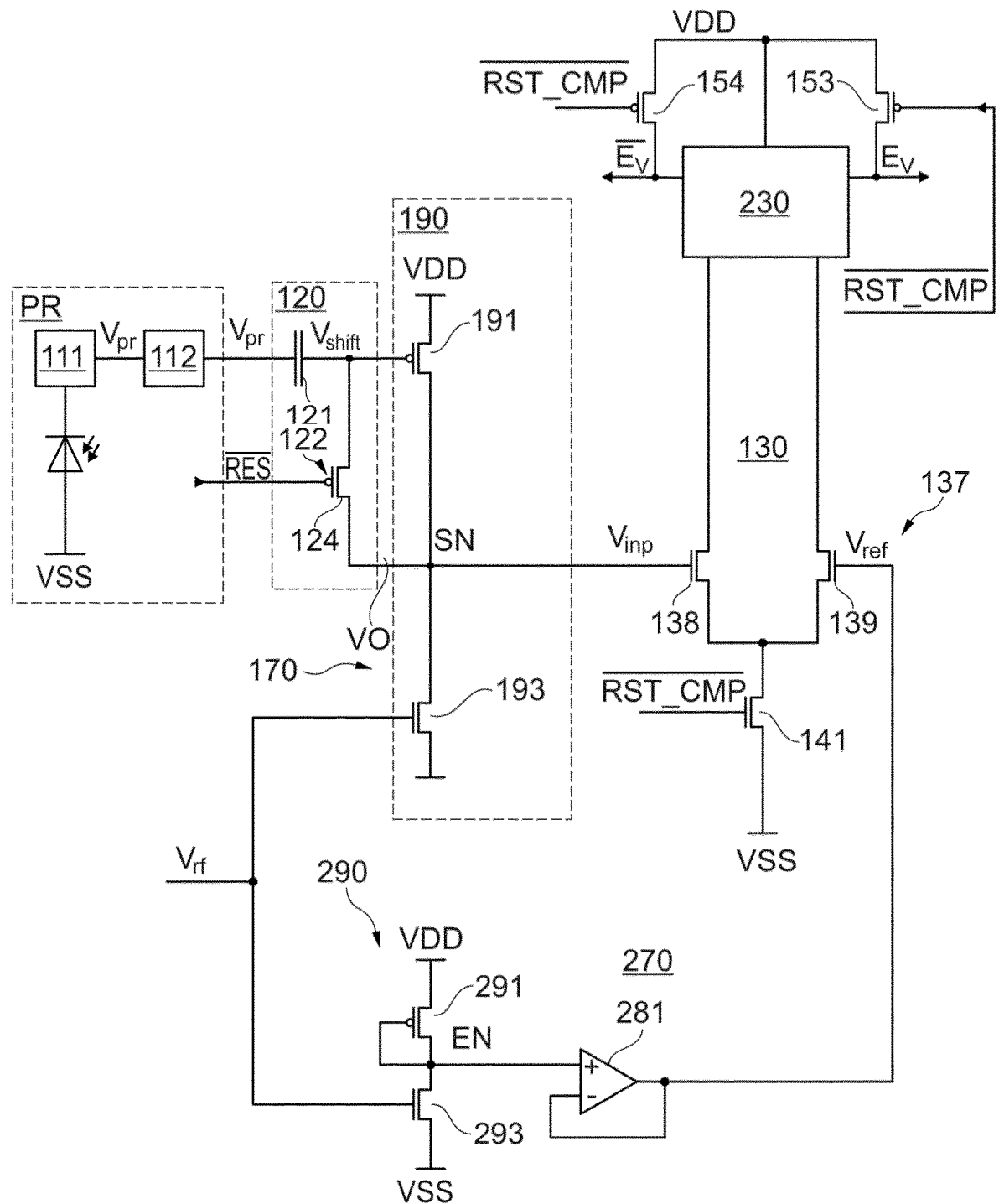
FIG. 9 is a simplified circuit diagram of a pixel circuit with a latch comparator circuit according to an embodiment with single-ended amplifier circuits for the input signals of the latch comparator circuit.

In each of FIGS. 7, 8, 9 the pixel circuits 100 include a pre-amplifier circuit 170 that amplifies and/or buffers the shifted voltage signal Vshft to generate the latch input signal Vinp and to pass the latch input signal Vinp to a signal input of the latch comparator circuit 130.

The pre-amplifier circuit 170 reduces the effect of differences between the input transistors of the latch comparator circuit 130 on the comparison results.

If a first latch comparator circuit is used for detecting the ON/rising event and a second latch comparator circuit is used for detecting the OFF/falling event, the first and the second latch comparator circuit may share the same output signal of the pre-amplifier circuit 170.

In FIG. 7 the pre-amplifier circuit 170 includes a differential amplifier 180.

The differential amplifier 180 may include a differential pair including a first input pFET 181 in a first current path between high potential and low potential and a second input pFET 182 in a second current path between high potential and low potential. The first current path further includes a load path of a first self-biased nFET 183 electrically connected between the source of the first input pFET 181 and the supply reference potential VSS. The second current path further includes a load path of a second self-biased nFET 184 electrically connected between the source of the first input pFET 181 and the supply reference potential VSS.

A tail current source 189, e.g. an FET with constant gate bias, is electrically connected between the positive supply voltage VDD and the drains of the first input pFET 181 and the second input pFET 182.

The shifted voltage signal Vshft is passed to the gate of the first input pFET 181. A constant reference voltage Vrf is passed to the gate of the second input pFET 182.

A first differential node DN1 between the first input pFET 181 and the first self-biased nFET 183 is connected to the signal input of the latch comparator circuit 130. A second differential node DN2 between the second input pFET 182 and the second self-biased nFET 184 is connected to the reference input of the latch comparator circuit 130. At the first and second differential nodes, the differential amplifier 180 generates complementary signals of a differential pair of voltage signals and the latch input signal Vinp and the latch reference signal Vref of the latch comparator circuit 130 are complementary signals of the differential pair of voltage signals.

The load path of a restore pFET 124 is electrically connected between the second electrode of the voltage memory capacitor 121 and the first differential node DN1 of the differential amplifier 180. In the voltage restore period the restore pFET 124 sets the potential of the second electrode of the voltage memory capacitor 121 to the potential at the first differential node DN1 of the differential amplifier 180. In this way, the restore pFET 124 both updates the memory voltage across the voltage memory capacitor 121 and "auto-zeroes" the differential amplifier 180, wherein "auto-zeroing" may significantly reduce the influence of low frequency noise and mismatch offset on the comparison decision in the latch comparator circuit 130.

The matching transistors of the differential pair in the differential amplifier 180 result in an inherently low offset voltage of the pixel portion that detects the voltage change.

In particular, the differential amplifier 180 achieves offset "cancellation" by saving the offset voltage of the differential amplifier on the memory node at the second electrode of the voltage memory capacitor 121 during the restore period. Basically, the output of the differential amplifier is connected to the memory node side input. This feedback configuration ensures that the memory node is at the voltage of the second amplifier input plus some offset that results from mismatch of supposedly matched transistors and/or from low frequency noise. When the memory node returns from the restore period, it starts from the reference voltage plus the amplifier offset plus the change in the photoreceptor signal Vpr. The gain of the differential amplifier 180 reduces the effect of the latch stage offset by a factor equal to the amplifier's gain.

The voltage restore circuit 122 resets the offset voltage between the latch comparator inputs in each voltage restore period, e.g. each time an event has been detected. Matching the voltages at the signal input and the reference input in the voltage restore period may also contribute in reducing pixel-to-pixel variations.

The differential amplifier 180 reduces the impact of noise and random mismatch in the latch comparator circuit 130 on the comparison decision. In addition, by decoupling to some degree the latch comparator circuit 130 and the memory voltage capacitor 121, the differential amplifier 180 also reduces the effect of output-to-input coupling ("kickback").

In addition, the differential input signal for the latch comparator circuit 130 improves operation of the latch comparator circuit 130 and may shorten the comparison period.

In FIG. 8 the reference input of the differential amplifier 180 is brought more in line with the signal input of the differential amplifier 180. In particular, a second electrode of a supplemental capacitor 185 is connected to the gate of the second input pFET 182 and the constant reference voltage Vrf is passed to a first electrode of the supplemental capacitor 185. A load path of a supplemental restore pFET 186 is electrically connected between the second electrode of the supplemental capacitor 185 and the second differential node DN2 of the differential amplifier 180. In the voltage restore period, the supplemental restore pFET 186 sets the potential of the second electrode of the supplemental capacitor 185 to the potential at the second differential output of the differential amplifier 180.

The gates of the load nFETs 183, 184 are biased with the same constant voltage bias Vbias.

A restore signal RES is passed to the gates of the restore pFET 124 and the supplemental restore pFET 186. The restore signal RES turns on the restore pFET 124 and the supplemental restore pFET 186 at least in a voltage restore period and may turn off the restore pFET 124 and the supplemental restore pFET 186 otherwise.

The supplemental capacitor 185 and the voltage memory capacitor 121 may match. In particular, the supplemental capacitor 185 and the voltage memory capacitor 121 may have the same capacitance. The restore pFET 124 and the supplemental restore pFET 186 may match. In particular, the restore pFET 124 and the supplemental restore pFET 186 may have the same gate length, the same gate width and may result from the same manufacturing processes defining the semiconducting source, drain and channel regions. By bringing the reference input of the differential amplifier 180 more in line with the signal input of the differential amplifier 180, offset errors and the effect of low frequency noise can be further reduced.

In FIG. 9 the pre-amplifier circuit 170 includes a single-ended pre-amplifier 190 including an input pFET 191 with a drain connected to the positive supply voltage VDD. A load path of a load nFET 193 is connected between the source of the input pFET 191 and the supply reference potential VSS. The shifted voltage signal Vshft is passed to the gate of the input pFET 191. The constant reference voltage Vrf biases the gate of the load nFET 193.

A single output node SN between the source of the input pFET 191 and the drain of the load nFET 193 is connected to the signal input of the latch comparator circuit 130. The amplifier output signal tapped from the single output node SN of the single-ended amplifier 190 provides the latch input signal Vinp, which is passed to the signal input of the latch comparator circuit 130.

The load path of the restore pFET 124 is connected between the second electrode of the voltage memory capacitor 121 and the single output node SN. In the voltage restore period, the restore pFET 124 sets the potential of the second electrode of the voltage memory capacitor 121 to the potential at the single output node SN.

From the constant reference voltage Vrf, a supplemental circuit 270 derives the latch reference signal Vref for the latch comparator circuit 130 in a way that corresponds to the way the latch input signal Vinp is derived from the shifted voltage signal Vshft.

In particular, the supplemental circuit 270 may include a supplemental single-ended pre-amplifier 290 that emulates the single-ended pre-amplifier 190. In particular, the supplemental circuit 270 may include an emulator pFET 291 and an emulator nFET 293. A drain of the emulator pFET 291 is connected to the positive supply voltage VDD. A load path of the emulator nFET 293 is connected in series between the source of the emulator pFET 291 and the supply reference potential VSS. The constant reference voltage Vrf biases the gate of the emulator nFET 293. An emulator output node EN between the emulator pFET 291 and the emulator nFET 193 is connected to the gate of the emulator pFET 291 and to the non-inverting input of an operational amplifier (OpAmp) 281. The output of the operational amplifier 281 is fed back to the inverting input and is fed forward to the reference input of the latch comparator circuit 130. The supplemental circuit 270 generates the latch reference signal Vref and passes the latch reference signal Vref to the reference input of the latch comparator circuit 130.

According to another example, the operational amplifier 281 may be omitted and the emulator output node EN between the emulator pFET 291 and the emulator nFET 193 is directly connected to the reference input of the latch comparator circuit 130, wherein the latch reference signal Vref is directly passed from the emulator output node EN to the gate of the second input transistor 139 of the latch input circuit 137.

The input pFET 191 and the emulator pFET 291 may match. In particular, the input pFET 191 and the emulator pFET 291 may have the same gate length, gate width and the same transistor parameters. The load nFET 193 and the emulator nFET 293 may match. In particular, the load nFET 193 and the emulator nFET 293 may have the same gate length, gate width and the same transistor parameters.

The supplemental circuit 270 may be provided for each single pixel circuit 100 or for a plurality of pixel circuit 100. For example, the supplemental circuit 270 may be signal-connected to the pixel circuit 100 assigned to the same pixel row, to the same pixel column, or to all pixel circuits 100 of a solid-state imaging device.

By bringing the reference input of the latch comparator circuit 130 more in line with the signal input of the latch comparator circuit 130, the supplemental circuit 270 may further contribute in reducing the effect of offset errors and low frequency noise on the comparison decision.

Referring again to FIGS. 1 and 2, the solid-state imaging device 90 includes a pixel array unit 10 including a plurality of pixel circuits 100. Each pixel circuit 100 includes a photoreceptor module PR that includes a photoelectric conversion element PD. The photoreceptor module PR outputs a photoreceptor signal with a voltage level depending on a detector current generated by the photoelectric conversion element PD. A voltage memory capacitor 121 receives the detector signal at a first electrode. The solid-state imaging device 90 further includes a latch comparator circuit 130 that receives a latch input signal based on a shifted voltage signal tapped from a second electrode of the voltage memory capacitor 121.

Each pixel circuit 100 may include a complete latch comparator circuit 130 and, if applicable, a complete pre-amplifier circuit.

According to another embodiment, a plurality of the pixel circuits 100 shares at least a portion of the latch comparator circuit 130.

For example, the latch comparator circuit 130 may be shared among all pixel circuits 100 of a pixel row, among all pixel circuits 100 of a pixel column or among all pixel circuits 100 of the solid-state imaging device 90.

Figure 10:
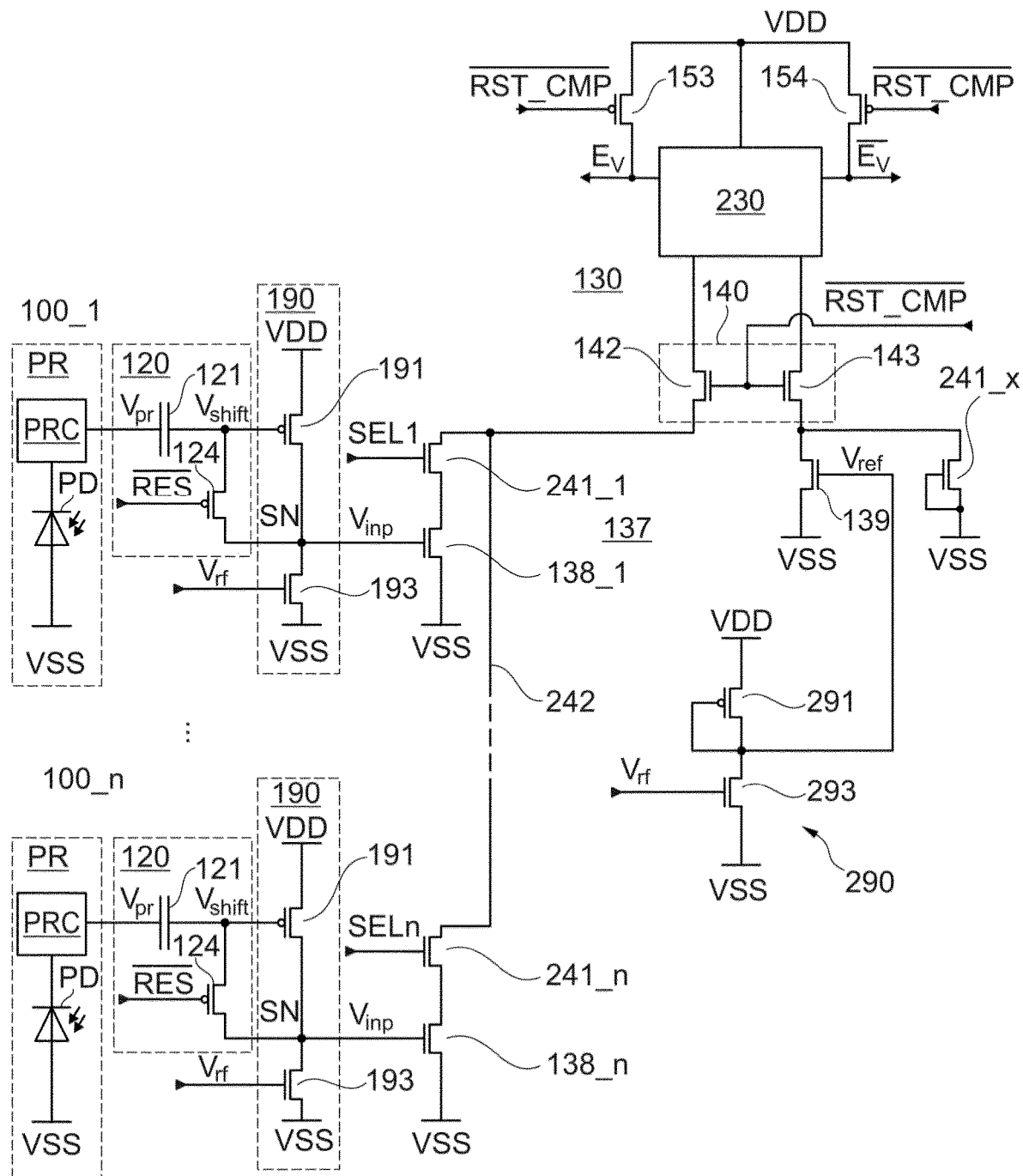
FIG. 10 is a simplified circuit diagram of a part of a solid-state imaging device including a latch comparator circuit signal-connected to a plurality of pixel circuits assigned to a same pixel column.

FIG. 10 refers to a solid-state imaging device 90 with a latch comparator circuit 130 including a latch structure 230 and a comparator reset circuit 150 that includes a first reset pFET 153 and a second reset pFET 154 and with a plurality of pixel circuit parts 100_1 . . . 100_n signal-connected to the latch comparator circuit 130. Each pixel circuit part 1001 . . . 100_n includes a photoreceptor module PRC, a voltage memory circuit 120 with a voltage memory capacitor 121 and a restore pFET 124, and a single-ended pre-amplifier 190 with an input pFET 191 and a load nFET 193.

The latch enable circuit 140 of the latch comparator circuit 130 is between the latch structure 230 and the latch input circuit 137. The latch input circuit 137 includes a plurality of input branches connected in parallel, wherein each input branch includes a first input transistor 138_1 . . . 138_n and a pixel select nFET 241_1 . . . 241_n connected in series between the latch enable circuit 140 and the supply reference potential VSS.

In particular, a load path of a first latch enable nFET 142 of the latch enable circuit 140 and the parallel-connected input branches are connected in series in this order between the low voltage node of the first inverter circuit of the latch structure 230 and the supply reference potential VSS. A pixel connection line 242 connects the source of the first latch enable nFET 142 with each input branch.

A load path of a second latch enable nFET 143 of the latch enable circuit 140 and a load path of the second input transistor 139 of the latch input circuit 137 are connected in series in this order between the low voltage node of the second inverter circuit of the latch structure 230 and the supply reference potential VSS.

A supplemental single-ended pre-amplifier 290 including an emulator pFET 291 and an emulator nFET 293 emulates the single-ended pre-amplifier 190, generates a latch reference signal Vref on the basis of the constant reference voltage Vrf and passes the latch reference signal Vref to the reference input (gate of the second input transistor 139).

The inverted latch reset signal $\overline{RST\_CMP}$ is passed to the gates of the first and second enable nFETs 142, 143. The inverted latch reset signal $\overline{RST\_CMP}$ turns on the first and second enable nFETs 142, 143 for each comparison period and turns off the first and second enable nFETs 142, 143 for each latch reset period.

Select signals SEL1 . . . . SELn are passed to the gates of the pixel select nFETs 241_1 . . . 241_n. Only one of the select signals SEL1 . . . . SELn is active and turns on one pixel select nFET 241_1 . . . 241_n at a time for a comparison period for the selected pixel circuit part 100_1 . . . 100_n. The selected pixel circuit part 100_1 . . . 100_n is signal-connected to the latch comparator circuit 130 via the individual latch input transistor 138_1 . . . 138_n.

A compensation nFET 241_x may be connected in parallel to the second input transistor 139 of the latch input circuit 137. The gate of the compensation nFET 241_x may be biased with a constant voltage, e.g. may be connected to the supply reference potential VSS. The drain-to-source capacitance CDS of the compensation nFET 241_x is selected to match the capacitive load on the Vref side of the latch comparator circuit 130 to the load from all pixel select nFETs 241_1 . . . 241_n connected to the pixel connection line 242. In particular, the compensation nFET 241_x may deviate from a pixel select nFET 241_1 . . . 241_n only in size, wherein the size of the compensation nFET 241_x may be n times the size of a single pixel select nFET 241.

Operating one single latch structure 230, one latch enable circuit 140, one comparator reset circuit 150 and one supplemental single-ended pre-amplifier 290 in time-multiplex for a plurality of pixel circuit parts 100_1 . . . 100_n significantly increases area efficiency.

Figure 11:
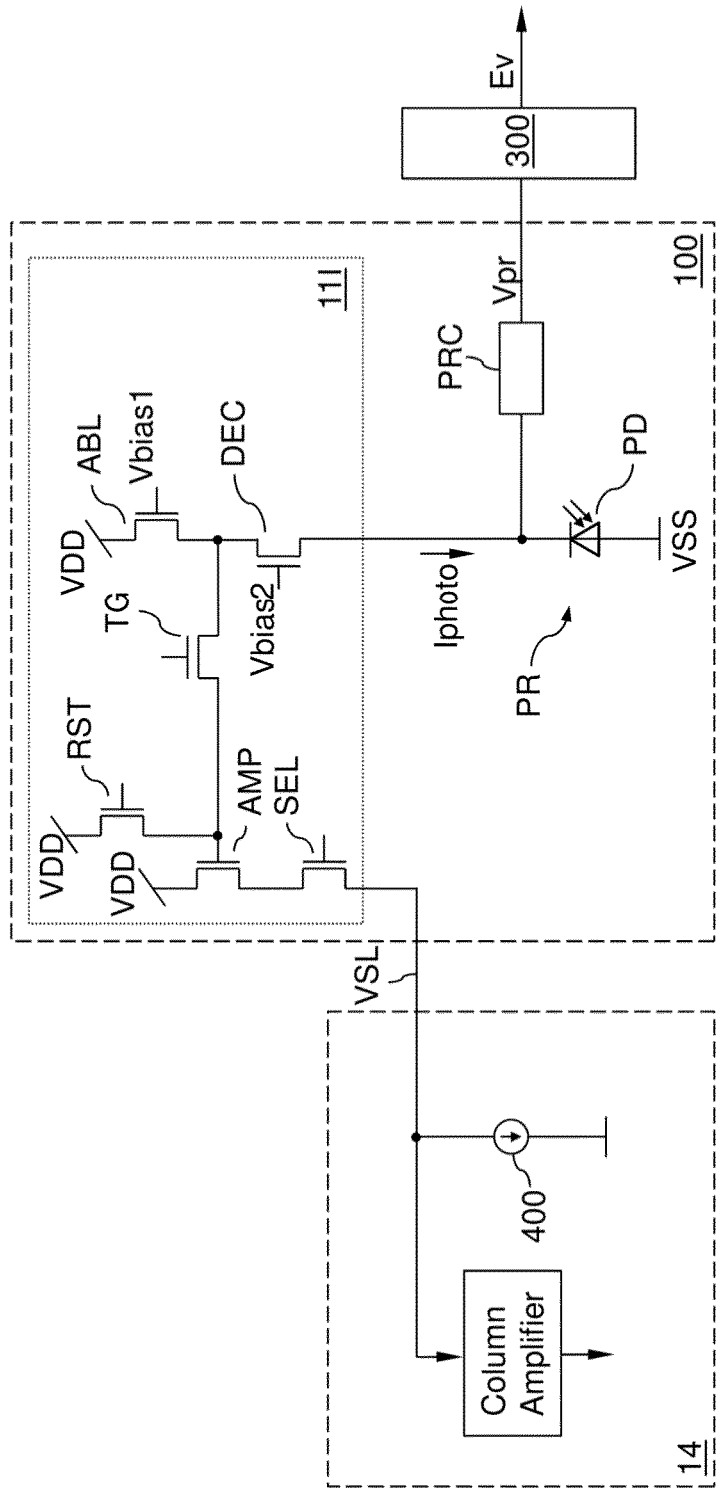
FIG. 11 is a simplified circuit diagram of a pixel circuit with simultaneous intensity readout and event detection.

FIG. 11 refers to a pixel circuit 100 including an intensity readout circuit 11I and a photoreceptor module PR for event detection, wherein the intensity readout circuit 11I and the photoreceptor module PR share a common photoelectric conversion element PD. The photoreceptor module PR includes a photoreceptor circuit PRC that converts the detector current Iphoto into a photoreceptor signal Vpr, wherein a voltage of the photoreceptor signal Vpr is a function of the photocurrent Iphoto, and wherein in the range of interest the voltage of the photoreceptor signal Vpr increases with increasing photocurrent Iphoto. The photoreceptor circuit PRC may include a logarithmic amplifier.

An event detector circuit 300 receives the photoreceptor signal Vpr and generates an event detection signal Ev when a change of the voltage level of the photoreceptor signal Vpr exceeds a predetermined threshold. The event detection circuit 300 includes a voltage memory circuit 120, a latch comparator circuit 130 and, if applicable, a pre-amplifier circuit 170 as described in the previous Figures.

The intensity readout circuit 11I may include an n-channel anti-blooming transistor ABL and an n-channel decoupling transistor DEC which are electrically connected in series between the high supply voltage VDD and the photoelectric conversion device PD. The anti-blooming transistor ABL and the decoupling transistor DEC may be controlled by fixed bias voltages Vbias1, Vbias2 applied to the gates. Additional elements, e.g. a controlled path of a feedback portion of the photodetector circuit PRC may be electrically connected in series between the decoupling transistor DEC and the photoelectric conversion device PD.

Decoupling transistor DEC may basically decouple the photodetector circuit PRC from voltage transients at the center node between the decoupling transistor DEC and the transistor ABL. Anti-blooming transistor ABL may ensure that the voltage at the center node between the decoupling transistor DEC and the transistor ABL does not fall below a certain level given by the difference between the bias voltage Vbias1 at the gate of the anti-blooming transistor ABL and the threshold voltage of the anti-blooming transistor ABL in order to ensure proper operation of the photodetector circuit PRC.

The source of the n-channel transfer transistor TG is electrically connected to the center node between the decoupling transistor DEC and transistor ABL. The transfer transistor TG transfers charge from the photoelectric conversion element PD to a floating diffusion region FD. The floating diffusion region FD serves as temporary local charge storage.

The reset transistor RST resets a potential of the floating diffusion FD to that of the power supply line supplying the positive supply voltage VDD in an intensity pixel reset period. The floating diffusion FD functions as the input node of the amplification transistor AMP. The amplification transistor AMP and the selection transistor SEL are connected in series between the power supply line and a data signal line VSL.

Thus, the amplification transistor AMP is connected to the data signal line VSL through the selection transistor SEL and constitutes a source-follower circuit with a current control circuit 400 formed as part of a column signal processing unit 14. The current control circuit 400 may be configured to be effective as constant current source.

Then, a selection signal serving as a control signal corresponding to an address signal is supplied to the gate of the selection transistor SEL through a selection control line, and the selection transistor SEL is turned on.

When the selection transistor SEL is turned on, the amplification transistor AMP amplifies the potential of the floating diffusion FD and outputs a voltage corresponding to the potential of the floating diffusion FD to the data signal line VSL. The data signal line VSL transfers an intensity pixel output signal from the pixel circuit 100 to the column signal processing unit 14.

Alternative embodiments of the intensity readout circuit 11I may be realized without transfer MOSFET, wherein the reset transistor RST may replace the anti-blooming transistor ABL, and wherein the source of the reset transistor RST is directly connected to the gate of the amplifier transistor AMP.

In the photoreceptor circuit block of FIG. 11, the intensity detection circuit 11I and the photoreceptor circuit PRC for event detection are electrically connected in series with respect to the detector current Iphoto, wherein evaluation of intensity and detection of events may be performed substantially contemporaneously.

Figure 12:
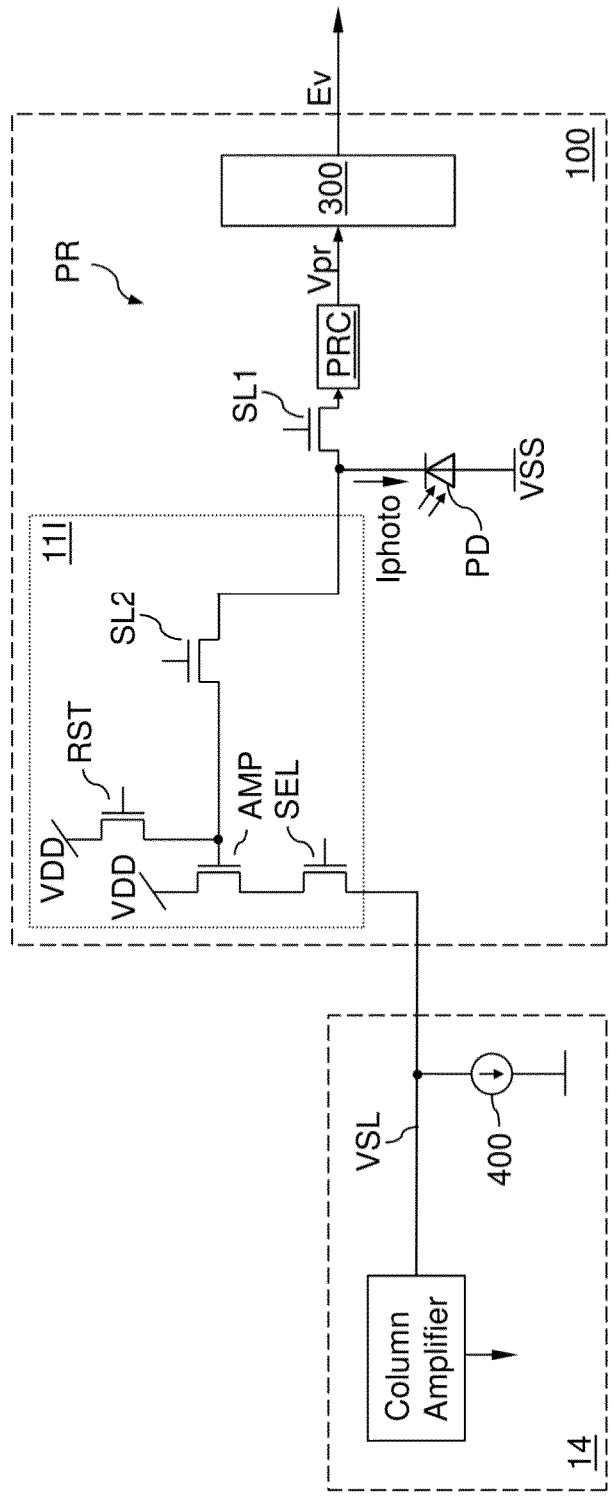
FIG. 12 is a simplified circuit diagram of a pixel circuit switchable between intensity readout and event detection.

The pixel circuit 100 in FIG. 12 includes a first mode selector SL1 and a second mode selector SL2. The first mode selector SL1 is connected between the cathode of the photoelectric conversion element PD and a photoreceptor circuit PRC. The second mode selector SL2 is connected between the cathode of the photoelectric conversion element PD and the amplifier transistor AMP of an intensity readout circuit 11I.

The first and second mode selectors SL1, SL2 electrically connect the photoelectric conversion element PD with the photoreceptor circuit PRC in a first operating state and with the intensity readout circuit 11I in a second operating state. In addition, the first and second mode selectors SL1, SL2 may disconnect the photoelectric conversion element PD from the intensity readout circuit 11I in the first operating state and may disconnect the photoelectric conversion element PD from the photoreceptor circuit PRC in the second operating state. The first and second mode selectors SL1, SL2 may be electronic switches, for example FETs or transfer gates.

Figure 13:
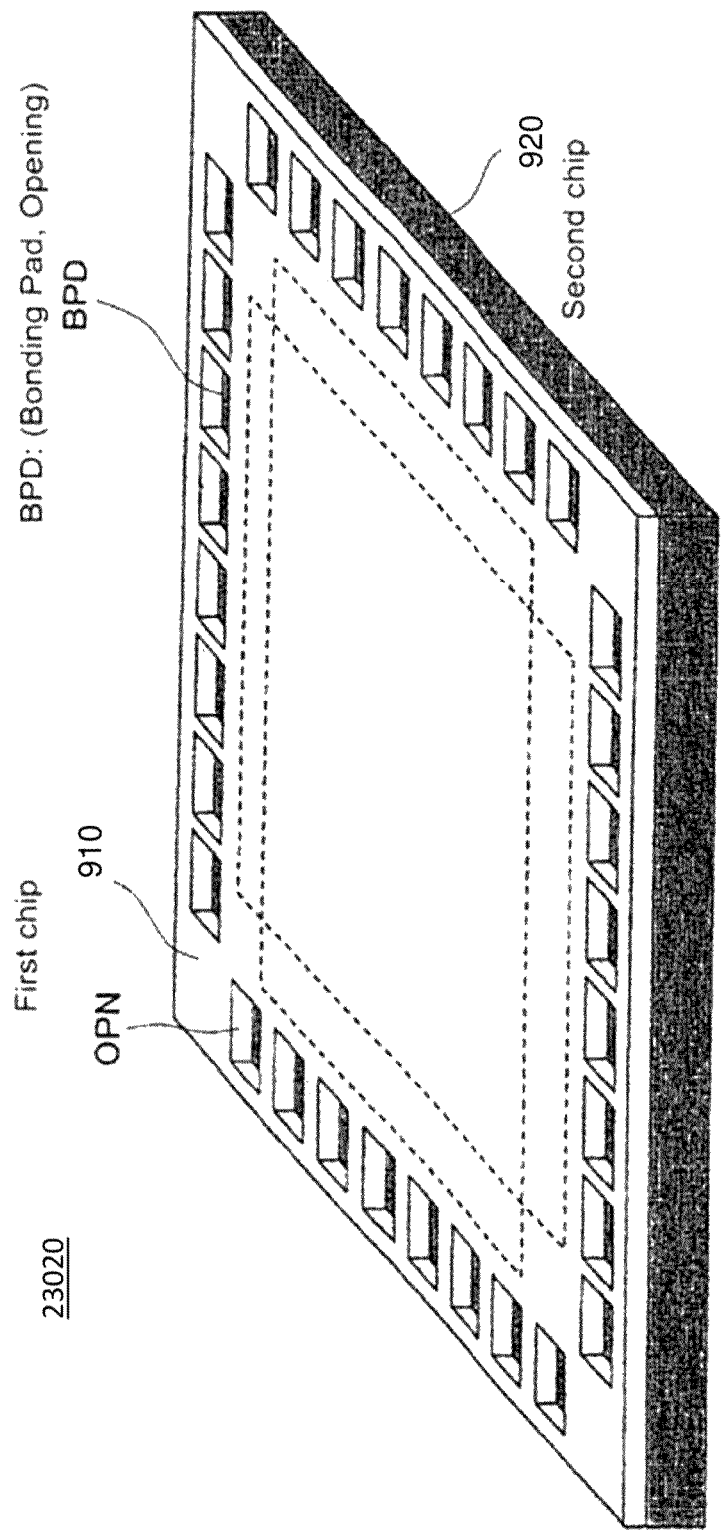
FIG. 13 is a diagram showing an example of a laminated structure of a solid-state imaging device according to an embodiment of the present disclosure.

FIG. 13 is a perspective view showing an example of a laminated structure of a solid-state imaging device 23020 with a plurality of pixels arranged matrix-like in array form. Each pixel includes at least one photoelectric conversion element.

The solid-state imaging device 23020 has the laminated structure of a first chip (upper chip) 910 and a second chip (lower chip) 920.

The laminated first and second chips 910, 920 may be electrically connected to each other through TC(S)Vs (Through Contact (Silicon) Vias) formed in the first chip 910.

The solid-state imaging device 23020 may be formed to have the laminated structure in such a manner that the first and second chips 910 and 920 are bonded together at wafer level and cut out by dicing.

In the laminated structure of the upper and lower two chips, the first chip 910 may be an analog chip (sensor chip) including at least one analog component of each pixel circuit, e.g., the photoelectric conversion elements arranged in array form.

For example, the first chip 910 may include only the photoelectric conversion elements of the pixel circuits 100 as described above with reference to the preceding FIGS. Alternatively, the first chip 910 may include further elements of each pixel circuit 100. For example, the first chip 910 may include, in addition to the photoelectric conversion elements, at least the n channel FETs of the photoreceptor circuits. According to another example, the first chip 910 may include the complete photoreceptor circuits, the voltage memory capacitors and at least parts of the pre-amplifier circuits and/or the latch comparator circuits. Alternatively, the first chip 910 may include each element of the pixel circuits including the latch comparator circuits.

The second chip 920 may be mainly a logic chip (digital chip) that includes the elements complementing the elements on the first chip 910 to complete pixel circuits. The second chip 920 may also include analog circuits, for example circuits that quantize analog signals transferred from the first chip 910 through the TCVs.

The second chip 920 may have one or more bonding pads BPD and the first chip 910 may have openings OPN for use in wire-bonding to the second chip 920.

The solid-state imaging device 23020 with the laminated structure of the two chips 910, 920 may have the following characteristic configuration:

The electrical connection between the first chip 910 and the second chip 920 is performed through, for example, the TCVs. The TCVs may be arranged at chip ends or between a pad region and a circuit region. The TCVs for transmitting control signals and supplying power may be mainly concentrated at, for example, the four corners of the solid-state imaging device 23020, by which a signal wiring area of the first chip 910 can be reduced.

Figure 14:
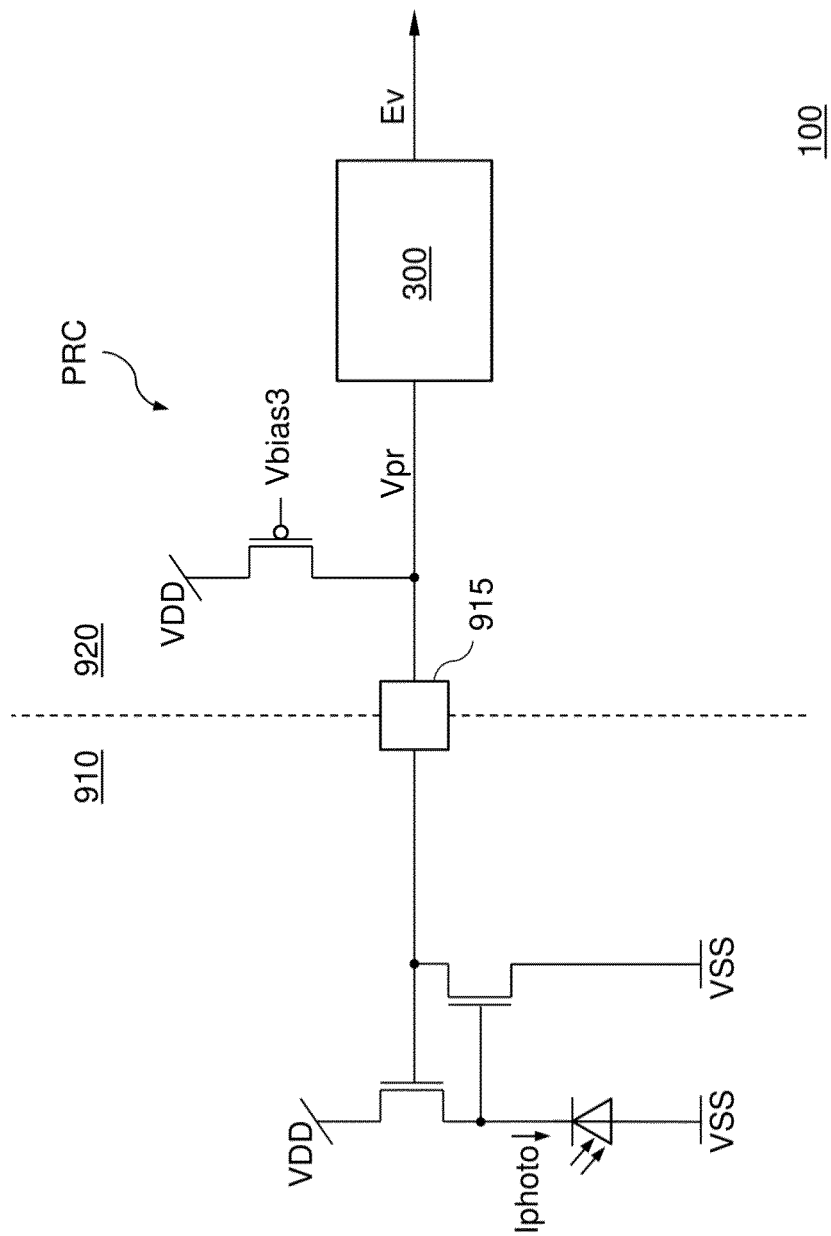
FIG. 14 is a schematic circuit diagram of a pixel circuit with a photoelectric conversion element and with elements of a photoreceptor circuit formed on a first chip of a solid-state imaging device with laminated structure according to an embodiment.

FIG. 14 shows a possible allocation of elements of a solid-state imaging device across the first chip 910 and the second chip 920 of FIG. 13. The first chip 910 includes the photoelectric conversion elements PD and the nFETs of the photoreceptor circuits PRC. The second chip 920 includes the pFETs of the photoreceptor circuits PRC and the event detector circuits 300. One through contact via 915 per pixel circuit 100 passes the photoreceptor signal Vpr from the first chip 910 to the second chip 920.

Figure 15:
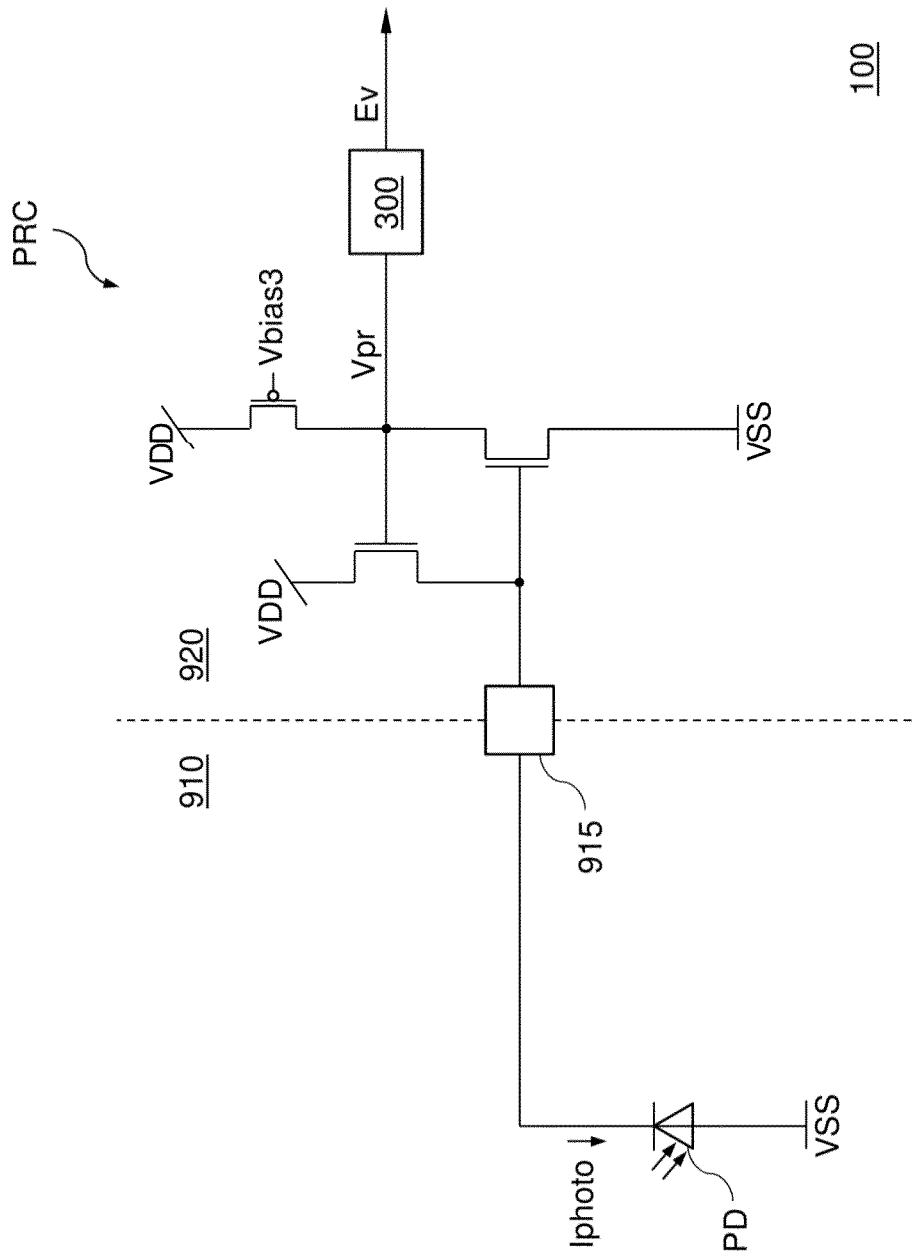
FIG. 15 is a schematic circuit diagram of a pixel circuit with the photoreceptor circuit mainly formed on a second chip of a solid-state imaging device with laminated structure according to an embodiment.

In FIG. 15 the first chip 910 includes only the photoelectric conversion elements PD. The second chip 920 includes the photoreceptor circuit PRC and the event detector circuits 300. One through contact via 915 per pixel circuit 100 passes the detector current Iphoto from the first chip 910 to the second chip 920.

Figure 16:
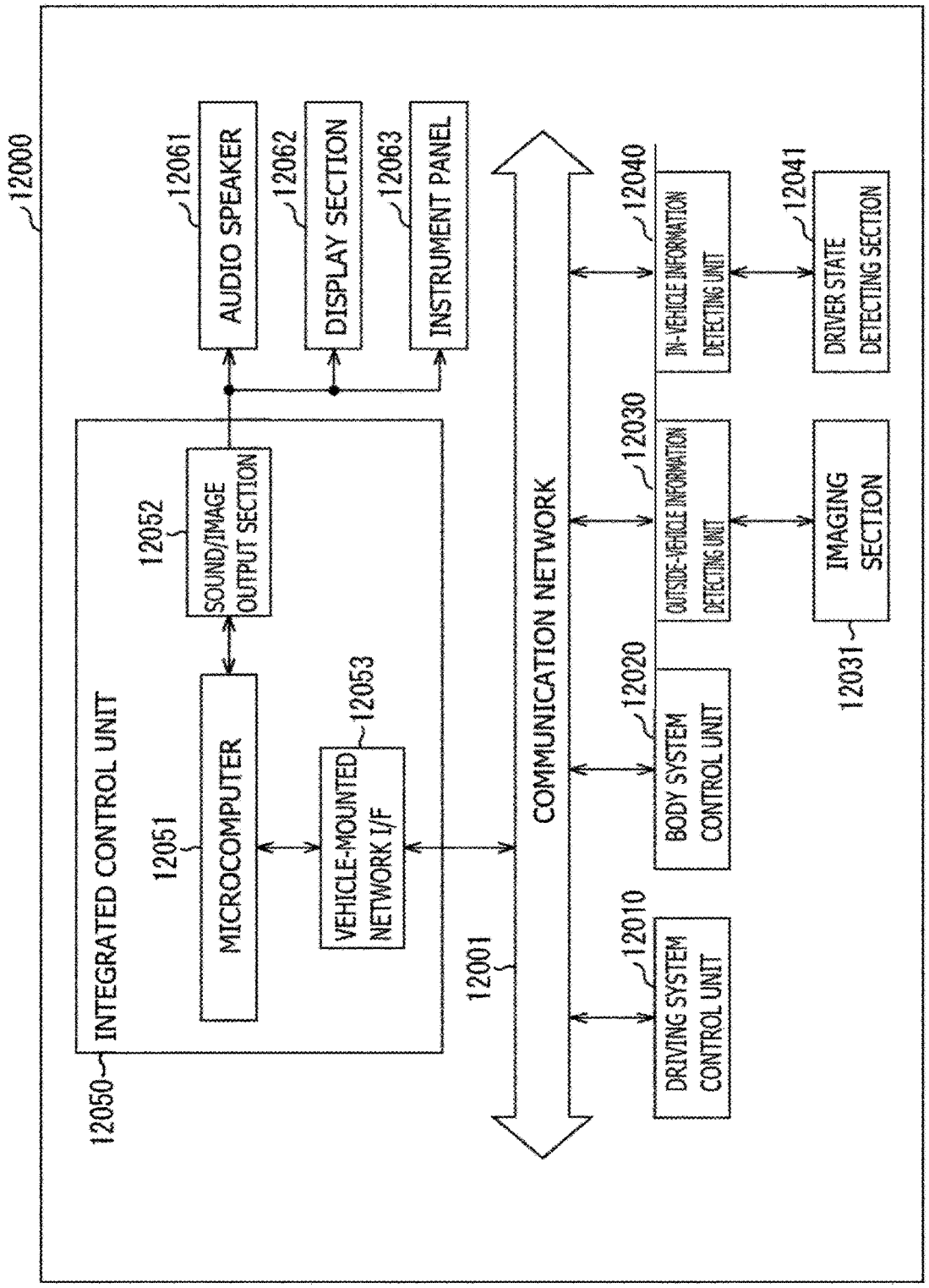
FIG. 16 is a block diagram depicting an example of a schematic configuration of a vehicle control system.

FIG. 16 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 16, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 imaging an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 may be or may include a solid-state imaging device with a latch comparator circuit according to the embodiments of the present disclosure. The light received by the imaging section 12031 may be visible light, or may be invisible light such as infrared rays or the like.

The in-vehicle information detecting unit 12040 detects information about the inside of the vehicle and may be or may include a solid-state imaging device with pixel circuits according to the embodiments of the present disclosure. The in-vehicle information detecting unit 12040 is, for example, connected with a driver state detecting section 12041 that detects the state of a driver. The driver state detecting section 12041, for example, includes a camera that includes the solid-state imaging device and that is focused on the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound or an image to an output device capable of visually or audible notifying information to an occupant of the vehicle or the outside of the vehicle. In the example of FIG. 16, an audio speaker 12061, a display section 12062, and an instrument panel 12063 are illustrated as the output device. The display section 12062 may, for example, include at least one of an on-board display or a head-up display, wherein each of them may include a solid-state imaging device using a latch comparator circuit for event detection.

Figure 17:
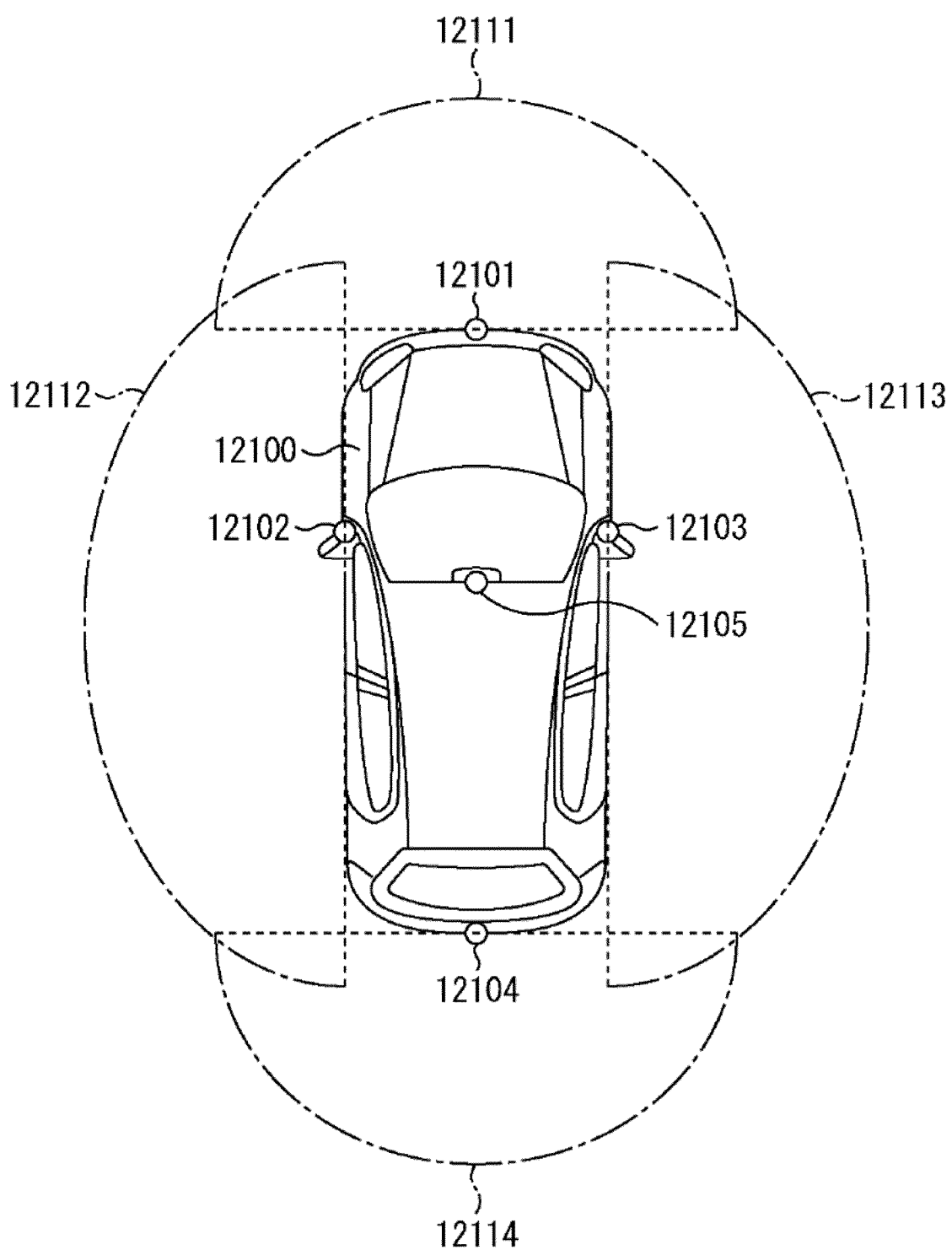
FIG. 17 is a diagram of assistance in explaining an example of installation positions of an outside-vehicle information detecting section and an imaging section of the vehicle control system of FIG. 16.

FIG. 17 is a diagram depicting an example of the installation position of the imaging section 12031, wherein the imaging section 12031 may include imaging sections 12101, 12102, 12103, 12104, and 12105.

The imaging sections 12101, 12102, 12103, 12104, and 12105 are, for example, disposed at positions on a front nose, side-view mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the side view mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 17 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the side view mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, imaging element having pixels for phase difference detection or may include a ToF module including a solid-state imaging device according to the present disclosure.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to an embodiment of the present disclosure is applicable has been described above. By applying pixel circuits with latch comparator circuits according to the embodiments, the sensors can be provided at reduced size and consume less power.

Additionally, embodiments of the present technology are not limited to the above-described embodiments, but various changes can be made within the scope of the present technology without departing from the gist of the present technology.

The solid-state imaging device with latch comparator circuits according to the present disclosure may be any device used for analyzing and/or processing radiation such as visible light, infrared light, ultraviolet light, and X-rays. For example, the solid-state imaging device may be any electronic device in the field of traffic, the field of home appliances, the field of medical and healthcare, the field of security, the field of beauty, the field of sports, the field of agriculture, the field of image reproduction or the like.

Specifically, in the field of image reproduction, the solid-state imaging device may be a device for capturing an image to be provided for appreciation, such as a digital camera, a smart phone, or a mobile phone device having a camera function. In the field of traffic, for example, the solid-state imaging device may be integrated in an in-vehicle sensor that captures the front, rear, peripheries, an interior of the vehicle, etc. for safe driving such as automatic stop, recognition of a state of a driver, or the like, in a monitoring camera that monitors traveling vehicles and roads, or in a distance measuring sensor that measures a distance between vehicles or the like.

In the field of home appliances, the solid-state imaging device may be integrated in any type of sensor that can be used in devices provided for home appliances such as TV receivers, refrigerators, and air conditioners to capture gestures of users and perform device operations according to the gestures. Accordingly the solid-state imaging device may be integrated in home appliances such as TV receivers, refrigerators, and air conditioners and/or in devices controlling the home appliances. Furthermore, in the field of medical and healthcare, the solid-state imaging device may be integrated in any type of sensor, e.g. a solid-state image device, provided for use in medical and healthcare, such as an endoscope or a device that performs angiography by receiving infrared light.

In the field of security, the solid-state imaging device can be integrated in a device provided for use in security, such as a monitoring camera for crime prevention or a camera for person authentication use. Furthermore, in the field of beauty, the solid-state imaging device can be used in a device provided for use in beauty, such as a skin measuring instrument that captures skin or a microscope that captures a probe. In the field of sports, the solid-state imaging device can be integrated in a device provided for use in sports, such as an action camera or a wearable camera for sport use or the like. Furthermore, in the field of agriculture, the solid-state imaging device can be used in a device provided for use in agriculture, such as a camera for monitoring the condition of fields and crops.

Note that the present technology can also be configured as described below:

(1) A pixel circuit including
a photoreceptor module including a photoelectric conversion element, wherein the photoreceptor module is configured to output a photoreceptor signal with a voltage level depending on a detector current generated by the photoelectric conversion element;
a voltage memory capacitor configured to receive the detector signal at a first electrode; and
a latch comparator circuit configured to receive a latch input signal based on a shifted voltage signal tapped from a second electrode of the voltage memory capacitor.

(2) The pixel circuit according to (1), further including a voltage restore circuit configured to connect the second electrode of the voltage memory capacitor to a capacitor reference node in a voltage restore period.

(3) The pixel circuit according to (1) or (2), wherein the latch comparator circuit is configured to generate a latched output signal indicating an increase and/or a decrease of the latch input signal by a threshold voltage.

(4) The pixel circuit according to (1) to (3), wherein the latch comparator circuit includes a first inverter circuit and a second inverter circuit, wherein the first inverter circuit and the second inverter circuit are in positive feedback, and wherein an input of the first inverter circuit is signal-connected to a signal input of the latch comparator circuit.

(5) The pixel circuit according to (1) to (4), wherein the latch comparator circuit includes a latch input circuit configured to decouple the latch input signal of the latch comparator circuit from signals generated by the latch comparator circuit.

(6) The pixel circuit according to (1) to (5), further including a latch enable circuit configured to enable the latch comparator circuit for a comparison period.

(7) The pixel circuit according to (1) to (6), further including a comparator reset circuit configured to pre-charge output capacitances of the latch comparator circuit in a latch reset period.

(8) The pixel circuit according to (1) to (7), wherein the latch comparator circuit includes a first inverter circuit and a second inverter circuit, wherein the first and second inverter circuits are in positive feedback, and wherein an input of the first inverter circuit is configured to receive the latch input signal, and wherein each of the inverter circuits includes a CMOS inverter.

(9) The pixel circuit according to (8), wherein the latch comparator circuit includes a first input transistor and a second input transistor, wherein a load path of the first input transistor is connected in series between the CMOS inverter of the first inverter circuit and a low potential node, and wherein a load path of the second input transistor is connected in series between the CMOS inverter of the second inverter circuit and the low potential node.

(10) The pixel circuit according to (1) to (9), wherein the latch comparator circuit is configured to receive the latch input signal at a signal input and to receive a latch reference signal at a reference input, and wherein the pixel circuit further includes a voltage restore circuit configured to match voltages at the signal input and the reference input of the latch comparator circuit in a voltage restore period.

(11) The pixel circuit according to (10), wherein the voltage restore circuit is configured to connect the signal input and the reference input of the latch comparator circuit in the voltage restore period.

(12) The pixel circuit according to (1) to (11), further including a pre-amplifier circuit configured to amplify and/or buffer the shifted voltage signal to generate the latch input signal and to pass the latch input signal to a signal input of the latch comparator circuit.

(13) The pixel circuit according to (12), wherein the pre-amplifier circuit includes a differential amplifier circuit.

(14) A solid-state imaging device, including
a pixel array unit including a plurality of pixel circuits, wherein each pixel circuit includes a photoreceptor module including a photoelectric conversion element, wherein the photoreceptor module is configured to output a photoreceptor signal with a voltage level depending on a detector current generated by the photoelectric conversion element, and a voltage memory capacitor configured to receive the detector signal at a first electrode; and
a latch comparator circuit configured to receive a latch input signal based on a shifted voltage signal tapped from a second electrode of the voltage memory capacitor.

(15) The solid-state imaging device according to (14), wherein a plurality of the pixel circuits shares at least a portion of the latch comparator circuit.

The invention claimed is:

1. A pixel circuit, comprising:
a photoreceptor module comprising a photoelectric conversion element, wherein the photoreceptor module is configured to output a photoreceptor signal with a voltage level depending on a detector current generated by the photoelectric conversion element;
a voltage memory capacitor configured to receive the detector signal at a first electrode; and
a latch comparator circuit configured to receive a latch input signal based on a shifted voltage signal tapped from a second electrode of the voltage memory capacitor, wherein the latch comparator circuit includes a signal input to receive the latch input signal, a reference input to receive a latch reference signal, and a control input to receive to receive a latch control signal.

2. The pixel circuit according to claim 1, further comprising:
a voltage restore circuit configured to connect the second electrode of the voltage memory capacitor to a capacitor reference node in a voltage restore period.

3. The pixel circuit according to claim 1, wherein the latch comparator circuit is configured to generate a latched output signal indicating an increase and/or a decrease of the latch input signal by a threshold voltage.

4. The pixel circuit according to claim 1,
wherein the latch comparator circuit comprises a first inverter circuit and a second inverter circuit,
wherein the first inverter circuit and the second inverter circuit are in positive feedback, and
wherein an input of the first inverter circuit is signal-connected to a signal input of the latch comparator circuit.

5. The pixel circuit according to claim 1, wherein the latch comparator circuit comprises a latch input circuit configured to decouple the latch input signal of the latch comparator circuit from signals generated by the latch comparator circuit.

6. The pixel circuit according to claim 1, further comprising:
a latch enable circuit configured to enable the latch comparator circuit for a comparison period.

7. The pixel circuit according to claim 1, further comprising:
a comparator reset circuit configured to pre-charge output capacitances of the latch comparator circuit in a latch reset period.

8. The pixel circuit according to claim 1,
wherein the latch comparator circuit comprises a first inverter circuit,
wherein the first and second inverter circuits are in positive feedback, and
wherein an input of the first inverter circuit is configured to receive the latch input signal, and
wherein each of the inverter circuits comprises a CMOS inverter.

9. The pixel circuit according to claim 8,
wherein the latch comparator circuit comprises a first input transistor and a second input transistor,
wherein a load path of the first input transistor is connected in series between the CMOS inverter of the second inverter circuit and a low potential node, and
wherein a load path of the second input transistor is connected in series between the CMOS inverter of the first inverter circuit and the low potential node.

10. The pixel circuit according to claim 1,
wherein the pixel circuit further comprises a voltage restore circuit configured to match voltages at the signal input and the reference input of the latch comparator circuit in a voltage restore period.

11. The pixel circuit according to claim 10, wherein the voltage restore circuit is configured to connect the signal input and the reference input of the latch comparator circuit in the voltage restore period.

12. The pixel circuit according to claim 1, further comprising:
a pre-amplifier circuit configured to amplify and/or buffer the shifted voltage signal to generate the latch input signal and to pass the latch input signal to a signal input of the latch comparator circuit.

13. The pixel circuit according to claim 12, wherein the pre-amplifier circuit comprises a differential amplifier circuit.

14. The pixel circuit according to claim 1, wherein the latch control signal triggers a comparison between the latch input signal and the latch reference signal.

15. The pixel circuit according to claim 14, wherein the latch comparator circuit latches a result of the comparison between the latch input signal and the latch reference signal and outputs the latched result as a digital output signal.

16. The pixel circuit according to claim 15, wherein the latch control signal resets the latch comparator circuit.

17. A solid-state imaging device, comprising:
a pixel array unit comprising a plurality of pixel circuits, wherein each pixel circuit comprises:
a photoreceptor module comprising a photoelectric conversion element, wherein the photoreceptor module is configured to output a photoreceptor signal with a voltage level depending on a detector current generated by the photoelectric conversion element;
a voltage memory capacitor configured to receive the detector signal at a first electrode; and
a latch comparator circuit configured to receive a latch input signal based on a shifted voltage signal tapped from a second electrode of the voltage memory capacitor, wherein the latch comparator circuit includes a signal input to receive the latch input signal, a reference input to receive a latch reference signal, and a control input to receive to receive a latch control signal.

18. The solid-state imaging device according to claim 17, wherein more than one of the pixel circuits shares at least a portion of the latch comparator circuit.

* * * * *